United States Patent [19]

Spells, III

[11] Patent Number: 5,623,593
[45] Date of Patent: Apr. 22, 1997

[54] SYSTEM AND METHOD FOR AUTOMATICALLY SPACING CHARACTERS

[75] Inventor: Henry D. Spells, III, Plano, Tex.

[73] Assignee: Macromedia, Inc., San Francisco, Calif.

[21] Appl. No.: 266,229

[22] Filed: Jun. 27, 1994

[51] Int. Cl.⁶ .................................................. G06F 17/21
[52] U.S. Cl. ..................... 395/172; 395/948; 400/304
[58] Field of Search ...................... 395/110, 150–151, 395/144–148; 354/5–19; 400/304, 306, 9; 345/25, 26, 128–130, 141–144; 364/419.1, 419.17

[56] References Cited

U.S. PATENT DOCUMENTS

| | | | |
|---|---|---|---|
| 3,712,443 | 1/1973 | Mathews | 400/304 |
| 4,027,313 | 5/1977 | Klepper et al. | 354/15 |
| 4,335,941 | 6/1982 | Moyroud et al. | 354/15 |
| 4,757,333 | 7/1988 | Baker et al. | 354/13 |
| 4,833,627 | 5/1989 | Leszczynski | 395/145 |
| 5,399,029 | 3/1995 | Muraoka et al. | 400/9 |
| 5,432,890 | 7/1995 | Watanabe | 395/100 |
| 5,501,538 | 3/1996 | Sawada et al. | 400/304 |

OTHER PUBLICATIONS

User's Guide for Software Program Fontographer, Jun. 1993, pp. 135–136, pp. 160–166, pp. 329, 386.

*Primary Examiner*—Joseph H. Feild
*Attorney, Agent, or Firm*—Fulbright & Jaworski L.L.P.

[57] ABSTRACT

A system and method for automatically spacing characters by an output device, such as a printer or printing press onto a medium. The automatic spacing process utilizes kerning pairs and associated kerning values as input and results in an output of characters onto a medium having a desired amount of white space or "color" associated therewith.

61 Claims, 9 Drawing Sheets

SYSTEM AND METHOD FOR AUTOMATICALLY SPACING CHARACTERS

FIELD OF THE INVENTION

The present invention relates to data processing systems, and in particular, to a system and method for automatically spacing characters to be displayed on a medium by a display device.

BACKGROUND OF THE INVENTION

Typography is the study and process of typefaces, i.e., how to select, size, arrange and use typefaces in general. A typeface is a specific, named design of a set of printed characters, such as Helvetica or Times Roman, that has a specified obliqueness (degree of slant) and stroke weight (thickness of line). Typeface may also refer to a size-independent graphical description of a set of characters. A typeface is generally not the same as a font, which is a specific size of a particular typeface, such as 12-point Helvetica or 10-point Times Roman.

To contrast the two, a font refers to all the characters available in a particular size, style, and weight for a particular design, whereas a typeface refers to the design itself. Hereinafter, the terms "typeface" and "font" may be used interchangeably.

Traditional typography involved the use of metal type with raised letterforms, which were inked and then pressed onto paper. When metal type was used in the first printing presses, the left and right sidebearings and the width of the characters were defined in physical terms based on the square pieces of metal that were formed in molds. (The left sidebearing of a character is defined as the horizontal distance from the character's origin to the left-most point in that character. The origin of the character is an imaginary point at which the character begins. This point marks the (0,0) point of a normal Cartesian coordinate system. The right sidebearing of a character is defined as the horizontal distance between the character's right-most point and the width of the character. This number is negative if the right-most point is beyond the width. The width of the character is the horizontal distance between the origin of the current character and the origin of the next character.) Ink was placed on the metal block and a portion of the metal block that was raised higher than the rest of the block left an imprint on the paper. The raised portion of the block could be a letter form or a character shape.

The left side of the metal block defined the origin line (a vertical line passing through the origin point) of the character and the right side of the metal block defined the width line (a vertical line that has a horizontal value equal to the width of the character). The left-most and the right-most raised portions of the block defined the left and right sidebearings, respectively.

In traditional printing, the metal blocks would be placed in juxtaposition to one another. If one desired to add more space between characters than provided by the metal blocks, then one had to add wood or metal spacers as needed. This allowed the metal blocks to be held tightly in place to control movement during the printing process. If the printer desired the width of the character to be smaller than its original design, he or she would file a portion of the metal off a side of the block.

In order to place two characters closer together than was physically possible with metal blocks, the printer created a special metal block containing two characters together on one piece of metal. Such characters are commonly referred to as kerning pairs, e.g., AV, WA, and YO, wherein the width of a character is different than it is normally because it is next to a certain character. To kern is to selectively alter the distance between pairs of letters, for readability and to make the type spacing more balanced and proportional.

Glyphs are graphical images associated with a particular character definition. Glyphs, which contain the image of more than one character, are usually referred to as ligatures. A ligature may contain slightly modified images of the characters for aesthetic reasons.

Even in modern typography, the relative placement of characters with respect to each other, commonly known as the spacing of a typeface or font, is a time consuming effort when done by hand. The type designer must decide what left and right sidebearings to place on each character in the typeface. In order to define the left sidebearing of the character, one must draw or place a graphical description of that character the desired distance from the origin. The width of the character is then determined by placing a width mark as shown in FIG. 1. The goal of this decision making process is to space each character such that the "color" of a particular page of characters is relatively even. (In this context, color does not refer to different wavelengths of light.) It is best described by example: when a larger amount of ink (usually black) is placed on one part of the page than is placed on another part of the same page, then the part of the page with the most ink appears darker. This relative comparison of the dark and light sections of the page is sometimes referred to as the "color" of the page.

To get a consistent "color" on the page, each character must have a consistent apparent width (the amount of white space that the eye perceives when viewing two or more characters next to each other) regardless of what character(s) lies next to it.

Often, it may be impossible to accomplish a consistent color for all possible character pairs solely by setting the width of the characters. In such a situation, special kerning pairs may be necessary, wherein the width of a particular character is modified only when the character appears to the left of another specific character. The type designer must then specify how much of the character's width must be modified when next to the specified second character. The value that specifies this change in width is referred to as the kerning (kern) value.

Fortunately, the field of typography is no longer limited to the physical constraints of metal type. With the advent of electronic typography, it has become much simpler to create negative sidebearings, kerning pairs, and ligatures in order to achieve the desired results.

To achieve the desired consistent "color," it might take the type designer several man-weeks or months to properly space and kern a typeface by traditional methods. Automation of this process greatly reduces the amount of time necessary to properly space and kern a typeface and therefore saves substantial time and money. However, despite the advent of electronic typography, achieving a well designed and aesthetically pleasing typeface is still a time consuming task.

One commercially available program, Fontographer®© available from Altsys Corporation, Dallas, Tex., the assignee of the present invention, automates the process of kerning fonts. This program is hereby incorporated by reference herein. This automatic kerning pair generation process creates a list of kerning pairs based on various user-defined parameters to provide a kerning pair for each and every possible character pair within a set of characters. The kerning is accomplished by the process after a desired spacing is determined by the user. However, a problem with this process is that it requires a considerable amount of memory to store each and every kerning pair.

Essentially, the kerning pair generation process begins after the type designer has designed the font for the characters. The type designer will use the process to design a spacing for the font that is aesthetically desirable. The process then computes kerning values for each of the kerning pairs, which adjust the base spacing values so that each pair is consistent with the overall desired "color" selected for the font.

Thereafter, when the printer wishes to utilize the font and the associated kerning pairs to print onto a medium (e.g., a display screen, paper, etc.), the printing process must then retrieve from memory each kerning pair of characters as required. Such a process is time consuming, since the memory store of kerning pairs must be searched for the appropriate kerning pair and value as each character is sent to the output device (display screen, printer, printing press).

Thus, though kerning pairs and their associated kerning values stored within memory may be utilized by a printing process, their use is inefficient because of the storage requirements for the kerning pairs and kerning values and because of the time consuming search process described above.

As a result, there is a need in the art for an automatic spacing process that maximizes the number of character combinations having the desired amount of white space ("color") between character pairs while requiring the fewest number of kerning pairs in order to achieve this desired amount of white space for all the specified pairs.

SUMMARY OF THE INVENTION

Therefore, it is an object of the present invention to provide a system and method for automatically spacing characters to be displayed on a medium so that there is a desired amount of white space between the characters while requiring the fewest number of kerning pairs in order to achieve the desired amount of white space for all the specified pairs.

In the attainment of the above objective, the present invention receives as input a list of kerning pairs, wherein each pair is associated with a relative distance value. Such a list may be provided by a kerning generating process implemented within a separate data processing system or within the data processing system implementing the present invention, or the list may be generated by hand or by some other non-computer utilized process. The present invention then utilizes the relative distance values in order to produce a new width for each first character within each group of character pairs. This new width information is then stored with the font information for each character and is outputted with its associated character to an output device for displaying the characters on a medium. The new width is used to position the characters in relation to each other.

The process of the present invention may be utilized in electronic typography or may be used to design the spacing and kerning for a set of metal type. With respect to electronic typography, the process produces an output for rasterization of a typeface on electrical or electromechanical devices. Examples of electromechanical devices include computer laser printers, dot matrix printers, ink jet printers, and any other type of printing apparatus, that operates in an electromechanical manner. Electrical devices include computer and television monitors, flat panel displays, and any other type of display medium.

More specifically, the present invention operates on inputted kerning values associated with inputted kerning pairs of characters. The process utilizes a set of subprocesses for individual operation on each group of kerning pairs, i.e., each group of character pairs wherein each of the pairs within a group begins with the same particular character. The subprocesses operate to select the kerning pair within a group which best represents the desired spacing between characters within a predefined or user defined range factor, or margin of error.

In an alternative embodiment of the present invention, a subprocess operates to monospace or proportionally space numeric characters.

In yet another alternative embodiment of the present invention, a means is provided to restrict or disallow a defined set of widths.

In another alternative embodiment of the present invention, a subprocess is provided to separately provide for the width of certain characters.

And, in yet another alternative embodiment of the present invention, widths for empty characters are developed within the present invention.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 15:
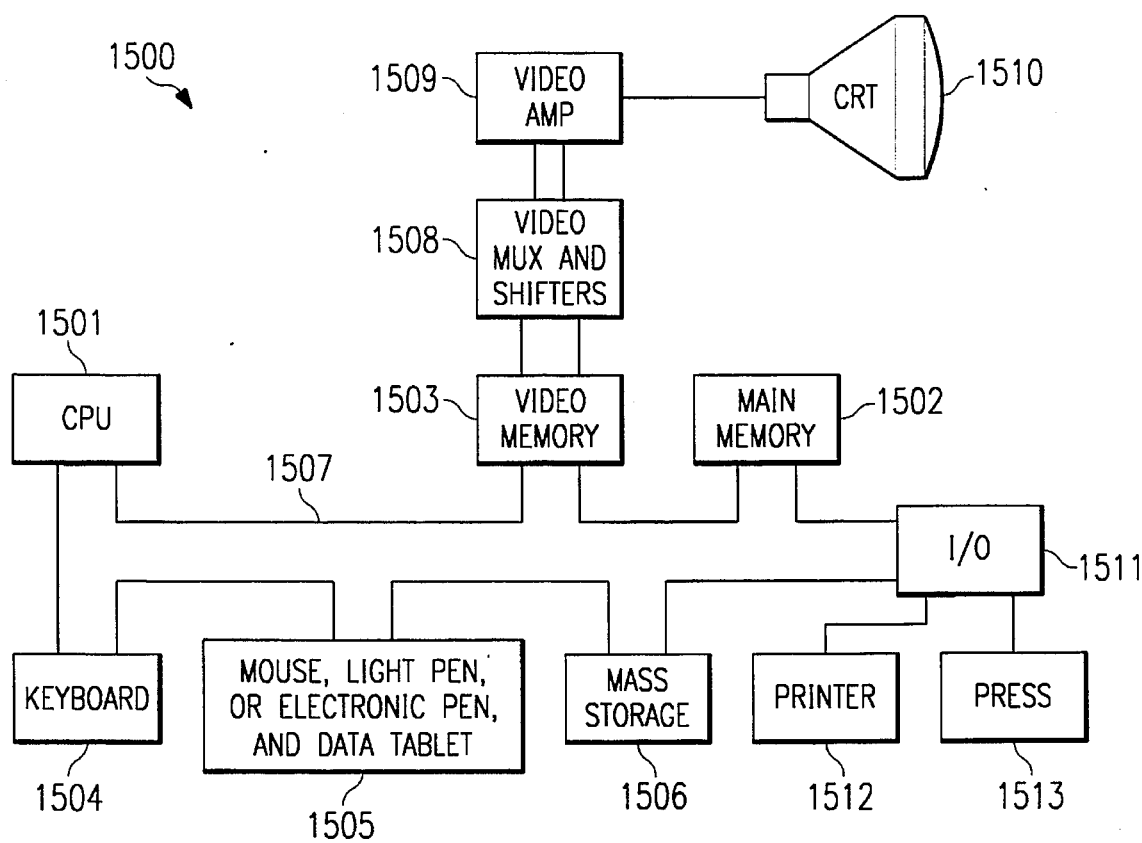
FIG. 15 illustrates a hardware configuration capable of embodying the present invention.

While the present invention may advantageously be implemented on nearly any conventional data processing system, exemplary data processing system 1500 on which the present invention is implemented is shown in FIG. 15.

FIG. 15 illustrates a preferred embodiment of hardware system 1500 implementing the present invention as part of a data processing system. In FIG. 15, system 1500 includes CPU 1501, main memory 1502, video memory 1503, keyboard 1504 for user input, supplemented by conventional mouse (or light pen, electronic pen and data tablet, etc.) 1505 for manipulating graphic images and mass storage 1506 which may include both fixed and removable media using any one or more of magnetic, optical or magneto-optical storage technology or any other available mass storage technology. These components are interconnected via conventional bidirectional system bus 1507. Bus 1507 contains address lines for addressing any portion of memory 1502 and 1503. System bus 1507 also includes a data bus for transferring data between and among CPU 1501, main memory 1502, video memory 1503, mass storage 1506 and input/output (I/O) port 1511. In the preferred embodiment of system 1500, CPU 1501 may be any suitable microprocessor or microcomputer. I/O port 1511 enables system 1500 to have access to the "outside world" (e.g., external systems, processes and printer 1512 and printing press 1513).

Main memory 1502 of system 1500 is a conventional dynamic random access memory of suitable size. Video memory 1503 is a conventional dual-ported video random access memory. Connected to a port of video memory 1503 is video multiplex and shifter circuitry 1508, to which in turn is connected video amplifier 1509. Video amplifier 1509 drives cathode-ray tube (CRT) raster display monitor 1510. Video multiplex and shifter circuitry 1508 and video amplifier 1509, which are conventional, convert pixel data stored in video memory 1503 to raster signals suitable for use by display monitor 1510. Monitor 1510 is of a type suitable for displaying graphic images. However, any type of display may be used to implement the present invention.

An advantage of the present invention is that it allows a type designer to specify a few parameters, to be described later, and allows the present invention to space an entire font in a short period of time. Although the present invention may utilize input from an automatic kerning pair generation process, such as the aforementioned Fontographer to create a list of kerning pairs, it is not required that the list of kerning pairs be determined by a process or computer in order to function as described herein. A list of hand-created kerning pairs is sufficient for the present invention. However, for the discussion to follow, input of the kerning pairs by a kerning pair generation process will be included in the discussion of the terminology and background.

Figure 1:
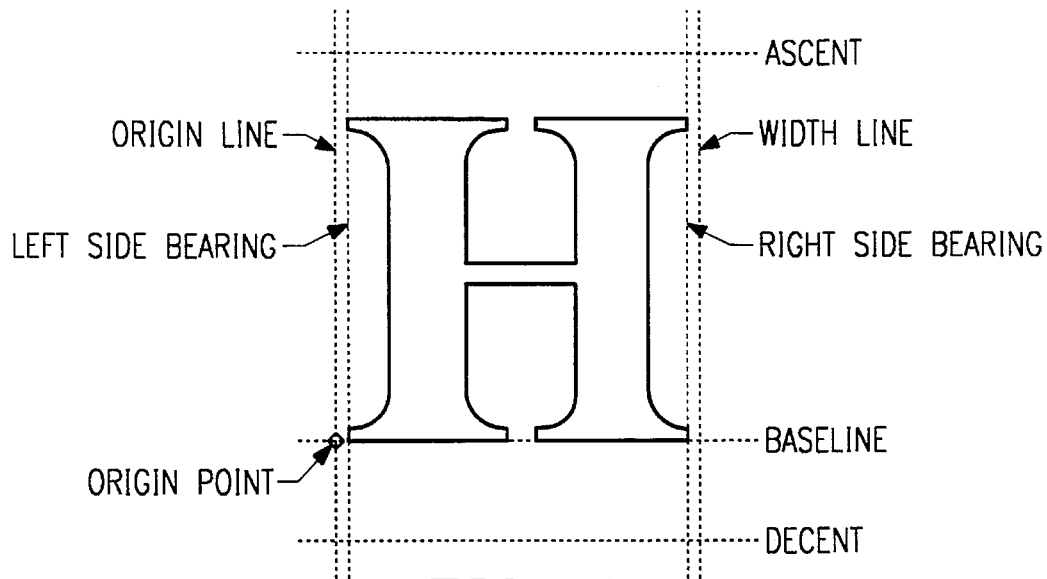
FIG. 1 illustrates an example character and characteristics associated with the character.

Referring to FIG. 1, there is illustrated the font character "H" with various designated parameters. The ascent is a reference point for the type designer. It is the maximum distance above the baseline. Generally, very few characters except special characters such as diacriticals rise above this line. A diacritic is a mark (e.g., circumflex, accent mark, cedilla, or umlaut) that is added to a letter to give the letter a special phonetic value. It is also used to distinguish words which are otherwise graphically identical. A diacritic may also be called an "accent." A diacritical is a character composed of at least two characters wherein one is a diacritic.

The baseline is the imaginary horizontal line on which all characters in a font rest. The descent is the maximum distance below the baseline. Generally, no characters extend below this line. The origin line is a vertical line that passes through the origin point. As discussed above, the origin of the character is an imaginary point at which the character begins. This point marks the (0,0) point of a normal Cartesian coordinate system.

The left sidebearing of a character is defined as the horizontal distance from the character's origin to the leftmost point in that character. The right sidebearing of a character is defined as the horizontal distance between the character's right-most point and the width of the character. This number is negative if the right-most point is beyond the width. The width of the character is the horizontal distance between the origin of the current character and the origin of the next character.

The concepts described herein may be similarly applied to vertically written languages such as Japanese, except that a character's top and bottom sides are controlled instead of the left and right sides as described herein. Nevertheless, the concepts of the present invention may be applied with respect to vertically written languages. Furthermore, the concepts of the present invention may be applied to languages which are written from right to left, such as Arabic.

Note, that the present invention is described with respect to alphanumeric characters. However, any type of displayable character may have its width determined by the present invention. Such characters include, but are not limited to, foreign language characters, graphical images, wingdings, Unicode fonts that use two-byte (2 characters) identifiers for each letter shape, and any other image creatable by a user or machine.

In the present discussion, the term "em square" refers to the total height of the font, which is generally equal to the ascent plus the descent.

As has been discussed above, a goal of an automatic spacing process is to achieve a desired amount of "color" or white space on a "page" of displayed characters, whether they are displayed on a monitor or printed matter.

Examine the following character pairs:

*Th Tk To Ty*

In this example, the width of the "T" is designated so that the "Th" and "Tk" character pairs have consistent widths, while the "To" and "Ty" combinations should be kerned to be closer together in order to look more consistent with the "Th" and "Tk" pairs. The existence of a "To" kerning pair modifies the width, or left sidebearing, of the "T" when placed to the left of the "o" causing the pair to appear closer together.

As discussed above, it is desirable to have a minimum number of kerning pairs in order to achieve the desired "color." Fewer kerning pairs reduce the amount of memory necessary to store and use the typeface within a data processing system. Instead, it is more efficient to associate a width, or spacing, with each character within a set of characters, since less memory is required, and the search process is simpler. The optimal spacing of a particular set of characters would therefore be the spacing that requires the fewest number of kerning pairs.

Some uses of font descriptions do not support kerning pairs. An example would be any one of the less feature-laden word processor programs available for today's microcomputers. In some of these cases, the width of a particular character needs to have negative sidebearings in order to achieve the goal of a consistent "color." However, this may result in undesirable overlap in certain useful character combinations such as the "Th" pair illustrated in FIG. 5. The present invention addresses this problem by allowing the user to specify whether or not to allow negative right sidebearings.

Figure 2:
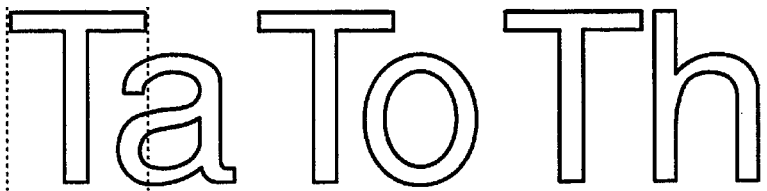
FIG. 2 illustrates a positive right sidebearing on "T" wherein kerning pairs are applied.
Figure 4:
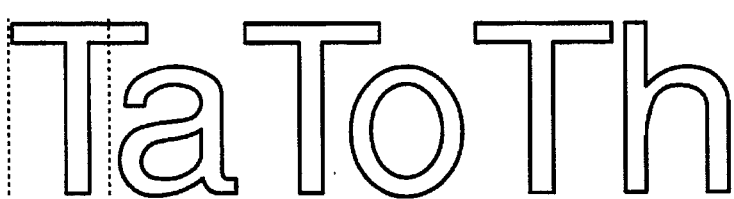
FIG. 4 illustrates a negative right sidebearing on "T" wherein the "Th" kerning pair is applied.

Note that the character pairs illustrated in FIGS. 2 and 4 appear very similar, even though the width and kerning data are very different. In FIG. 2, the "T" has a positive right sidebearing. The kerning pairs "Ta" and "To" have been applied to achieve a desired spacing. In FIG. 4, the "T" utilizes a negative right sidebearing. As a result, the "Th" kerning pair has been applied within the process to achieve a consistent "color".

Figure 3:
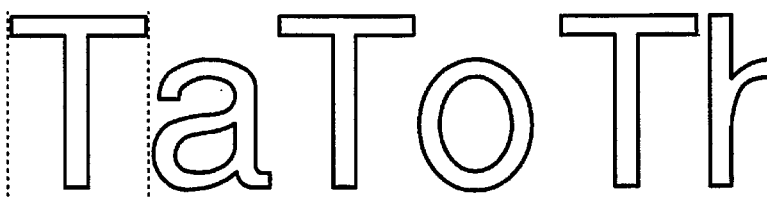
FIG. 3 illustrates a positive right sidebearing on "T" wherein no kerning pairs are applied.
Figure 5:
FIG. 5 illustrates a negative right sidebearing on "T" wherein no kerning pairs are applied.

FIG. 3 illustrates a positive right sidebearing on the character "T." However, no kerning pairs have been applied within the spacing process, resulting in arguably an undesirable spacing. FIG. 5 illustrates a similar situation where no kerning pairs have been applied within the spacing process. A negative right sidebearing on the character "T" has been applied so that the character combinations "Ta" and "To" result in a more desirable spacing. However, the result is that the character pair "Th" is overlapping.

Though the spacing may be more desirable within the character pairs illustrated in FIG. 5, it is arguable that the character combinations illustrated in FIG. 3 are desirable over those illustrated in FIG. 5 because of the overlap within the character pair "Th."

Figure 6:
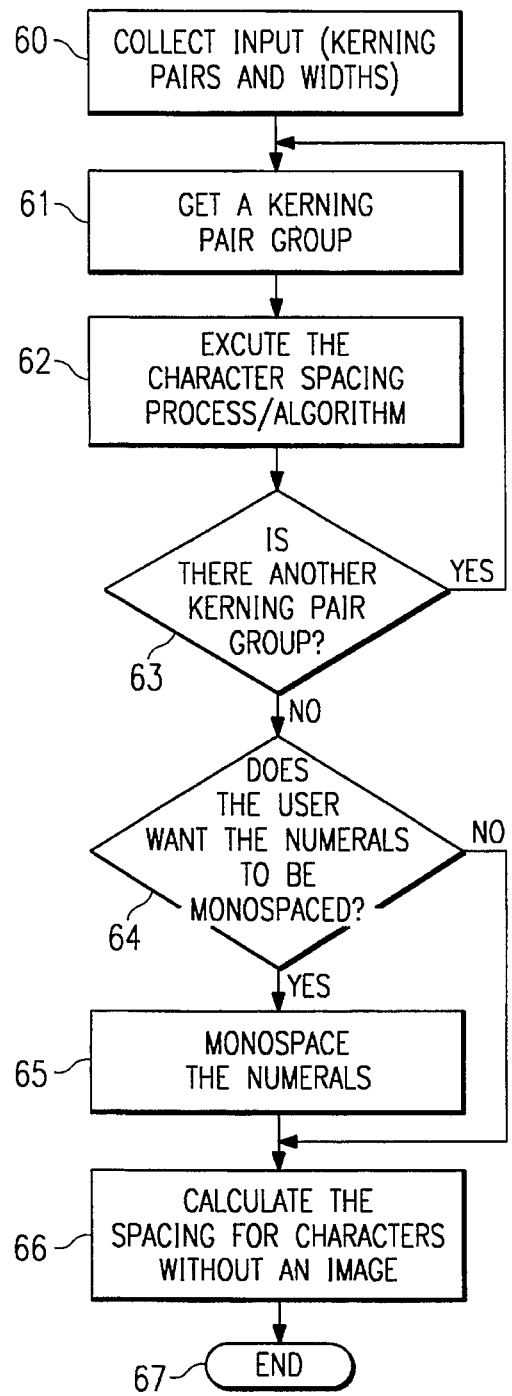
FIG. 6 illustrates a flow diagram for the automatic spacing process of the present invention.

Referring next to FIG. 6, there is illustrated a flow diagram operable within system 1500 for spacing of characters. In step 60, kerning pairs and associated kerning values or widths are entered into system 1500, preferably through I/O 1511. Alternatively, this input could be entered manually utilizing keyboard 1504, input means 1505 or through the input of data into mass storage 1506. Alternatively, an automatic kerning process such as the one available in the aforementioned Fontographer (or through the commercially available FontStudio™ also from Altsys Corporation, or the user may specify the list of pairs and their associated values from a file such as the standard Adobe Font Metrics file which is a standard commercially available process for storing kerning pair information and available from the Adobe Corporation) may be utilized and implemented within system 1500 for operation by CPU 1501.

The kerning values specify the change in width needed to achieve the desired look when characters are placed next to one another. As mentioned before, the kerning pairs can be user defined or computer generated.

For the benefit of the following description, and by way of illustration for ease of discussion, the following generated kerning pairs and associated kerning values will be utilized for input for the present invention:

TABLE 1

| First Character | Second Character | Kerning Value |
|---|---|---|
| A | A | 10.69660 |
| A | B | 7.45654 |
| A | C | −6.68478 |
| A | D | 7.79602 |
| A | E | 8.55779 |

TABLE 1-continued

| First Character | Second Character | Kerning Value |
|---|---|---|
| A | F | 8.13112 |
| A | G | −6.72377 |
| A | H | 6.47282 |
| A | I | 6.30136 |
| A | J | −1.31534 |
| A | K | 7.72591 |
| A | L | 8.36601 |
| A | M | 7.41290 |
| A | N | 7.44185 |
| A | O | −7.16280 |
| A | P | 7.19453 |
| A | Q | −6.53224 |
| A | R | 6.71350 |
| A | S | 4.90298 |
| A | T | −12.87250 |
| A | U | −8.45033 |
| A | V | −14.85770 |
| A | W | −15.67620 |
| A | X | 9.21584 |
| A | Y | −5.33211 |
| A | Z | 5.18051 |
| B | A | −0.155106 |
| B | B | −2.13701 |
| B | C | 2.30391 |
| B | D | −1.96576 |
| B | E | −2.48825 |
| B | F | −1.56644 |
| B | G | 2.26746 |
| B | H | −1.88824 |
| B | I | −2.94435 |
| B | J | −3.22040 |
| B | K | −1.88956 |
| B | L | −1.74623 |
| B | M | −0.656662 |
| B | N | −2.37375 |
| B | O | 2.06639 |
| B | P | −1.91383 |
| B | Q | 2.35457 |
| B | R | −1.81242 |
| B | S | 1.89430 |
| B | T | 0.423126 |
| B | U | −2.54272 |
| B | V | −0.77298 |
| B | W | −1.52602 |
| B | X | −2.13205 |
| B | Y | 4.19005 |
| B | Z | −2.25719 |

Note, for the present example, this inputted data only includes two groups of kerning pairs, wherein the first group of kerning pairs has as its first character the character "A", and the second group has as its first character the character "B". The kerning value is a relative displacement value that is added to the width of the first character within each pair so that the "color" between the first character and second character within each pair is as desired.

Also entered into system 1500 is the following data (also produced by the aforementioned input sources) with respect to first characters "A" and "B":

TABLE 2

| | | | bounding box information | | | |
|---|---|---|---|---|---|---|
| Character | width | minimum value | top value | left value | bottom value | right value |
| A | 81.375 | 61.5 | 81.5 | 1.25 | −0.25 | 59.75 |
| B | 68.75 | 47.8 | 84.25 | −4.0 | 0.0 | 76.875 |

Within this data, the entered width of character "A" is equal to 81.375 units. Note that these units do not equate to a length measurement such as inches or millimeters, but are dependent upon the particular font designed (for example, using Fontographer). Such designations are well known within the printing press art.

The inputted data indicates also that the character "A" is permitted to have a minimum width of 61.5 units. This information may be utilized by the present invention to ensure that the width provided by the automatic spacing process described herein does not allow the width of the character "A" to fall below 61.5 units. Note also that the bounding box information denotes the actual boundaries of the width and height of character "A".

The kerning value of 7.45654 associated with the kerning pair "AB" indicates that when these two characters are displayed next to each other on a medium, 7.45654 units will be added to the original width of character "A"(81.375).

The character pair "AW" has a kerning value of −15.67620 units. This number of units will be added to 81.375, the original width of the first character "A," when the character pair "AW" is displayed on an output medium.

As may be seen, the kerning values for each pair modify the width of the first character, whether it be character "A" or "B" so that when either is placed to the left of any of the other characters, the user-defined "color" is maintained within the parameters designated within the kerning value generating process disclosed above, whichever it may have been.

Furthermore, one can readily see that if all of the letters of the alphabet, both lower case and upper case, including any other desired characters, are then placed through a kerning value generating process (automatic or manual) to arrive at the kerning values for each possible character pair, a considerable amount of memory will be required to store each of these pairs and the associated kerning values. Moreover, when each letter is outputted to the output device (e.g., I/O port 1511 or CRT 1510), a considerable amount of retrieval time will be required to retrieve each pair and its associated kerning value. As discussed below, an object of the present invention is to alleviate these two problems by minimizing the need for kerning pairs in order to space characters, in a manner consistent with the previously defined spacing parameters.

By way of example only, the above kerning pair and kerning value information in Table 1 was obtained through the use of the aforementioned Fontographer kerning pair generating process. This information was obtained by kerning character "A" and character "B" with characters "A" through "Z" with a font having an "em square" of 125 units and with a specification that the characters should be 10 units apart. Numeric characters were specified to be monospaced, and negative right sidebearings were allowed. A margin of error, or grouping factor, was entered to be 2.5. This pre-defined margin of error, which may be user defined or a default value, may also be utilized elsewhere within the present invention as discussed below, or the user may designate a separate margin of error. This margin of error represents a range of spacing between characters acceptable to the user. Therefore, if either the kerning value generating process or the process of the present invention computes a relative spacing for a character that lies within this margin of error, the relative spacing will be accepted. This margin of error assists in streamlining both processes.

Figure 7:
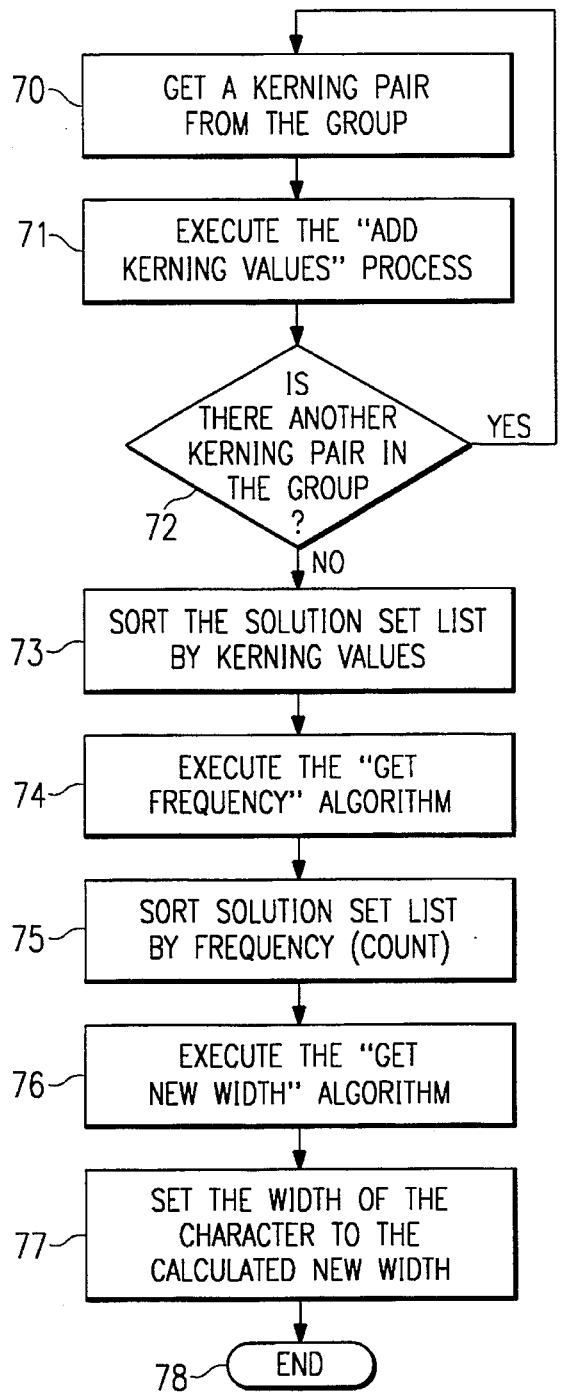
FIG. 7 illustrates a flow diagram for the character spacing process within the present invention.

Referring again to FIG. 6, in step 61 a kerning pair group is retrieved from the inputted information. Such a group is illustrated above in Table 1 wherein character "A" is the first character for all pairs within the group. Next, in step 62, the character spacing subprocess further illustrated in FIG. 7 is executed with respect to the retrieved kerning pair group. This process is further discussed below with respect to FIG. 7.

Next, in step 63, the process determines whether or not any other kerning pair groups need to be processed. In this case, with the data inputted as shown above in Table 1, there is another kerning pair group, the group having as its first character, character "B". The character spacing process of FIG. 7 and step 62 would then be executed with respect to this second kerning pair group.

Once all kerning pair groups have been processed by the character spacing process, step 64 requests the user to designate whether or not numeric characters are to be monospaced.

If the user does not wish to monospace numeric characters, the process moves to step 66. However, if numeric characters are to be monospaced, the process will shift to step 65 to monospace numeric characters, as discussed below with respect to FIG. 13.

Figure 14:
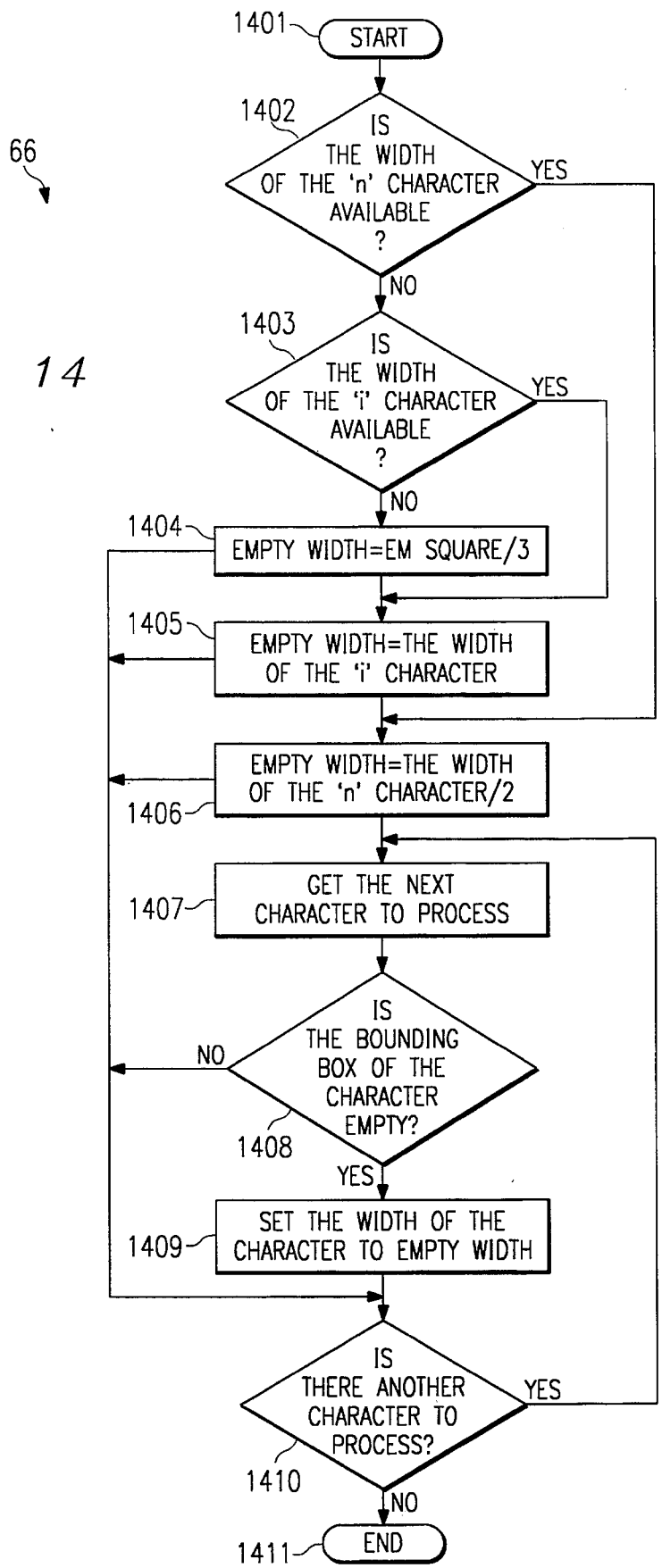
FIG. 14 illustrates a flow diagram for calculating spacing for empty characters.

Thereafter, step 66 calculates spacing for characters without an image, i.e., empty characters, which are those characters that have a width but do not have a graphical image associated with them. FIG. 14 illustrates such a subprocess. Lastly, the automatic spacing process ends at step 67.

As noted above, step 62 refers to a character spacing subprocess, which is illustrated in FIG. 7. The subprocess in FIG. 7 begins with step 70 wherein a kerning pair is retrieved from the retrieved kerning pair group (see step 61). Thereafter, at step 71, kerning values are added to a solution set list. Referring to the data inputted and provided in Table 1, the first kerning pair is the character pair "AA," having a kerning value of 10.69660. Step 71 provides a solution set list to be utilized within the present invention, which consists of each kerning pair and its associated kerning value, along with two derived solutions based on the original kerning value for each pair, the first solution being a "minus" solution and the second solution being a "plus" solution, with the original solution being designated hereinafter as the "zero" solution. Essentially, the kerning value for the "minus" solution is derived by subtracting a pre-defined margin of error, as discussed above, from the original kerning value shown in Table 1 for each pair. The "zero" solution is essentially comprised of the original kerning value, and the "plus" solution is derived by adding the margin of error to the original kerning value. The results of steps 70–72 for character "A" are shown in Table 3.

TABLE 3

| | Each item is in the order that it was added to the solution set. | | | | | |
|---|---|---|---|---|---|---|
| Solution type | Kerning value | count | left count | left value | right value | |
| Minus solution | 8.19658 | 0 | 0 | 8.19658 | 8.19658 | A A Pair solutions |
| Zero solution | 10.6966 | 0 | 0 | 10.6966 | 10.6966 | |
| Plus solution | 13.1966 | 0 | 0 | 13.1966 | 13.1966 | |
| Minus solution | 4.95654 | 0 | 0 | 4.95654 | 4.95654 | A B Pair solutions |
| Zero solution | 7.45654 | 0 | 0 | 7.45654 | 7.45654 | |

TABLE 3-continued

| | Each item is in the order that it was added to the solution set. | | | | | |
|---|---|---|---|---|---|---|
| Solution type | Kerning value | count | left count | left value | right value | |
| Plus solution | 9.95654 | 0 | 0 | 9.95654 | 9.95654 | |
| Minus solution | −9.18478 | 0 | 0 | −9.18478 | −9.18478 | A C Pair solutions |
| Zero solution | −6.68478 | 0 | 0 | −6.68478 | −6.68478 | |
| Plus solution | −4.18478 | 0 | 0 | −4.18478 | −4.18478 | |
| Minus solution | 5.29602 | 0 | 0 | 5.29602 | 5.29602 | A D Pair solutions |
| Zero solution | 7.79602 | 0 | 0 | 7.79602 | 7.79602 | |
| Plus solution | 10.296 | 0 | 0 | 10.296 | 10.296 | |
| Minus solution | 6.05779 | 0 | 0 | 6.05779 | 6.05779 | A E Pair solutions |
| Zero solution | 8.55779 | 0 | 0 | 8.55779 | 8.55779 | |
| Plus solution | 11.0578 | 0 | 0 | 11.0578 | 11.0578 | |
| Minus solution | 5.63112 | 0 | 0 | 5.63112 | 5.63112 | A F Pair solutions |
| Zero solution | 8.13112 | 0 | 0 | 8.13112 | 8.13112 | |
| Plus solution | 10.6311 | 0 | 0 | 10.6311 | 10.6311 | |
| Minus solution | −9.22377 | 0 | 0 | −9.22377 | −9.22377 | A G Pair solutions |
| Zero solution | −6.72377 | 0 | 0 | −6.72377 | −6.72377 | |
| Plus solution | −4.22377 | 0 | 0 | −4.22377 | −4.22377 | |
| Minus solution | 3.97282 | 0 | 0 | 3.97282 | 3.97282 | A H Pair solutions |
| Zero solution | 6.47282 | 0 | 0 | 6.47282 | 6.47282 | |
| Plus solution | 8.97282 | 0 | 0 | 8.97282 | 8.97282 | |
| Minus solution | 3.80136 | 0 | 0 | 3.80136 | 3.80136 | A I Pair solutions |
| Zero solution | 6.30136 | 0 | 0 | 6.30136 | 6.30136 | |
| Plus solution | 8.80136 | 0 | 0 | 8.80136 | 8.80136 | |
| Minus solution | −3.81534 | 0 | 0 | −3.81534 | −3.81534 | A J Pair solutions |
| Zero solution | −1.31534 | 0 | 0 | −1.31534 | −1.31534 | |
| Plus solution | 1.18466 | 0 | 0 | 1.18466 | 1.18466 | |
| Minus solution | 5.22591 | 0 | 0 | 5.22591 | 5.22591 | A K Pair solutions |
| Zero solution | 7.72591 | 0 | 0 | 7.72591 | 7.72591 | |
| Plus solution | 10.2259 | 0 | 0 | 10.2259 | 10.2259 | |
| Minus solution | 5.86601 | 0 | 0 | 5.86601 | 5.86601 | A L Pair solutions |
| Zero solution | 8.36601 | 0 | 0 | 8.36601 | 8.36601 | |
| Plus solution | 10.866 | 0 | 0 | 10.866 | 10.866 | |
| Minus solution | 4.9129 | 0 | 0 | 4.9129 | 4.9129 | A M Pair solutions |
| Zero solution | 7.4129 | 0 | 0 | 7.4129 | 7.4129 | |
| Plus solution | 9.9129 | 0 | 0 | 9.9129 | 9.9129 | |
| Minus solution | 4.94185 | 0 | 0 | 4.94185 | 4.94185 | A N Pair solutions |
| Zero solution | 7.44185 | 0 | 0 | 7.44185 | 7.44185 | |
| Plus solution | 9.94185 | 0 | 0 | 9.94185 | 9.94185 | |
| Minus solution | −9.6626 | 0 | 0 | −9.6626 | −9.6628 | A O Pair solutions |
| Zero solution | −7.1628 | 0 | 0 | −7.1628 | −7.1628 | |
| Plus solution | −4.6628 | 0 | 0 | −4.6628 | −4.6628 | |
| Minus solution | 4.69453 | 0 | 0 | 4.69453 | 4.69453 | A P Pair solutions |
| Zero solution | 7.19453 | 0 | 0 | 7.19453 | 7.19453 | |
| Plus solution | 9.69453 | 0 | 0 | 9.69453 | 9.69453 | |
| Minus solution | −9.03224 | 0 | 0 | −9.03224 | −9.03224 | A Q Pair solutions |
| Zero solution | −6.53224 | 0 | 0 | −6.53224 | −6.53224 | |
| Plus solution | −4.03224 | 0 | 0 | −4.03224 | −4.03224 | |
| Minus solution | 4.2135 | 0 | 0 | 4.2135 | 4.2135 | A R Pair solutions |
| Zero solution | 6.7135 | 0 | 0 | 6.7135 | 6.7135 | |
| Plus solution | 9.2135 | 0 | 0 | 9.2135 | 9.2135 | |
| Minus solution | 2.40298 | 0 | 0 | 2.40298 | 2.40298 | A S Pair solutions |
| Zero solution | 4.90298 | 0 | 0 | 4.90298 | 4.90298 | |
| Plus solution | 7.40298 | 0 | 0 | 7.40298 | 7.40298 | |
| Minus solution | −15.3725 | 0 | 0 | −15.3725 | −15.3725 | A T Pair solutions |
| Zero solution | −12.8725 | 0 | 0 | −12.8725 | −12.8725 | |
| Plus solution | −10.3725 | 0 | 0 | −10.3725 | −10.3725 | |
| Minus solution | −10.9503 | 0 | 0 | −10.9503 | −10.9503 | A U Pair solutions |
| Zero solution | −8.45033 | 0 | 0 | −8.45033 | −8.45033 | |
| Plus solution | −5.95033 | 0 | 0 | −5.95033 | −5.95033 | |
| Minus solution | −17.3577 | 0 | 0 | −17.3577 | −17.3577 | A V Pair solutions |
| Zero solution | −14.8577 | 0 | 0 | −14.8577 | −14.8577 | |
| Plus solution | −12.3577 | 0 | 0 | −12.3577 | −12.3577 | |
| Minus solution | −18.1762 | 0 | 0 | −18.1762 | −18.1762 | A W Pair solutions |
| Zero solution | −15.6762 | 0 | 0 | −15.6762 | −15.6762 | |
| Plus solution | −13.1762 | 0 | 0 | −13.1762 | −13.1762 | |
| Minus solution | 6.71584 | 0 | 0 | 6.71584 | 6.71584 | A X Pair solutions |
| Zero solution | 9.21584 | 0 | 0 | 9.21584 | 9.21584 | |
| Plus solution | 11.7158 | 0 | 0 | 11.7158 | 11.7158 | |
| Minus solution | −7.83211 | 0 | 0 | −7.83211 | −7.83211 | A Y Pair solutions |
| Zero solution | −5.33211 | 0 | 0 | −5.33211 | −5.33211 | |
| Plus solution | −2.83211 | 0 | 0 | −2.83211 | −2.83211 | |
| Minus solution | 2.68051 | 0 | 0 | 2.68051 | 2.68051 | A Z Pair solutions |
| Zero solution | 5.18051 | 0 | 0 | 5.18051 | 5.18051 | |
| Plus solution | 7.68051 | 0 | 0 | 7.68051 | 7.68051 | |

Each of the kerning values listed in Table 1 is a possible solution to the determination of how much the width of each character is to be modified to achieve the desired spacing. The best solution for each character will be the solution that comprises the most kerning values within the predefined margin of error. The "plus" and "minus" solutions have been developed, since such solutions may provide better results by eliminating an additional kerning pair within the present invention. For example, through the process to be described below, eventually the "plus" solution will be chosen to provide the best solution in the case of character "B."

Note, the kerning value for the "minus" solution associated with kerning pair "AA" has a value of 8.19658, which is equal to 10.6966−2.5 (the margin of error). The "plus" solution of 13.1966 equates to the original kerning value of 10.6966 plus the error margin.

Note, within Table 3, the columns labeled as "count," "left count," "left value" and "right value." The values in these columns will become more important as discussed below. For the present, the count, or frequency value, and the left count are initialized at 0 for each solution. The left and right values are set to the kerning values associated with their solution.

The subprocess then continues to step 72 to determine whether or not there is another kerning pair within the group. If so, steps 70 and 71 are repeated. The results of steps 70–72 for character "B" are shown in Table 4.

TABLE 4

Each item is in the order that it was added to the solution set.

| Solution type | Kerning value | count | left count | left value | right value | |
|---|---|---|---|---|---|---|
| Minus solution | −2.65511 | 0 | 0 | −2.65511 | −2.65511 | B A Pair solutions |
| Zero solution | −0.155106 | 0 | 0 | −0.155106 | −0.155106 | |
| Plus solution | 2.34489 | 0 | 0 | 2.34489 | 2.34489 | |
| Minus solution | −4.63701 | 0 | 0 | −4.63701 | −4.63701 | B B Pair solutions |
| Zero solution | −2.13701 | 0 | 0 | −2.13701 | −2.13701 | |
| Plus solution | 0.362991 | 0 | 0 | 0.362991 | 0.362991 | |
| Minus solution | −0.196091 | 0 | 0 | −0.196091 | −0.196091 | B C Pair solutions |
| Zero solution | 2.30391 | 0 | 0 | 2.30391 | 2.30391 | |
| Plus solution | 4.80391 | 0 | 0 | 4.80391 | 4.80391 | |
| Minus solution | −4.46576 | 0 | 0 | −4.46576 | −4.46576 | B D Pair solutions |
| Zero solution | −1.96576 | 0 | 0 | −1.96576 | −1.96576 | |
| Plus solution | 0.534241 | 0 | 0 | 0.534241 | 0.534241 | |
| Minus solution | −4.98825 | 0 | 0 | −4.98825 | −4.98825 | B E Pair solutions |
| Zero solution | −2.48825 | 0 | 0 | −2.48825 | −2.48825 | |
| Plus solution | 0.0117493 | 0 | 0 | 0.0117493 | 0.0117493 | |
| Minus solution | −4.06644 | 0 | 0 | −4.06644 | −4.06644 | B F Pair solutions |
| Zero solution | −1.56644 | 0 | 0 | −1.56644− | −1.56644 | |
| Plus solution | 0.933563 | 0 | 0 | 0.933563 | 0.933563 | |
| Minus solution | −0.232544 | 0 | 0 | −0.232544 | −0.232544 | B G Pair solutions |
| Zero solution | 2.26746 | 0 | 0 | 2.26746 | 2.26746 | |
| Plus solution | 4.76746 | 0 | 0 | 4.76746 | 4.76746 | |
| Minus solution | −4.38824 | 0 | 0 | −4.38824 | −4.38824 | B H Pair solutions |
| Zero solution | −1.88824 | 0 | 0 | −1.88824 | −1.88824 | |
| Plus solution | 0.611755 | 0 | 0 | 0.611755 | 0.611755 | |
| Minus solution | −5.44435 | 0 | 0 | −5.44435 | −5.44435 | B I Pair solutions |
| Zero solution | −2.94435 | 0 | 0 | −2.94435 | −2.94435 | |
| Plus solution | −0.444351 | 0 | 0 | −0.444351 | −0.444351 | |
| Minus solution | −5.7204 | 0 | 0 | −5.7204 | −5.7204 | B J Pair solutions |
| Zero solution | −3.2204 | 0 | 0 | −3.2204 | −3.2204 | |
| Plus solution | −0.720398 | 0 | 0 | −0.720398 | −0.720398 | |
| Minus solution | −4.38956 | 0 | 0 | −4.38956 | 4.38956 | B K Pair solutions |
| Zero solution | −1.88956 | 0 | 0 | −1.88956 | −1.88956 | |
| Plus solution | 0.610443 | 0 | 0 | 0.610443 | 0.610443 | |
| Minus solution | −4.24623 | 0 | 0 | −4.24623 | −4.24623 | B L Pair solutions |
| Zero solution | −1.74623 | 0 | 0 | −1.74623 | −1.74623 | |
| Plus solution | 0.753769 | 0 | 0 | 0.753769 | 0.753769 | |
| Minus solution | −3.15666 | 0 | 0 | −3.15666 | −3.15666 | B M Pair solutions |
| Zero solution | −0.656662 | 0 | 0 | −0.656662 | −0.656662 | |
| Plus solution | 1.84334 | 0 | 0 | 1.84334 | 1.84334 | |
| Minus solution | −4.87375 | 0 | 0 | −4.87375 | −4.87375 | B N Pair solutions |
| Zero solution | −2.37375 | 0 | 0 | −2.37375 | −2.37375 | |
| Plus solution | 0.126251 | 0 | 0 | 0.126251 | 0.126251 | |
| Minus solution | −0.433609 | 0 | 0 | −0.433609 | −0.433609 | B O Pair solutions |
| Zero solution | 2.06639 | 0 | 0 | 2.06639 | 2.06639 | |
| Plus solution | 4.56639 | 0 | 0 | 4.56639 | 4.56639 | |
| Minus solution | −4.41383 | 0 | 0 | −4.41383 | −4.41383 | B P Pair solutions |
| Zero solution | −1.91383 | 0 | 0 | −1.91383 | −1.91383 | |
| Plus solution | 0.586166 | 0 | 0 | 0.586166 | 0.586166 | |
| Minus solution | −0.145432 | 0 | 0 | −0.145432 | −0.145432 | B Q Pair solutions |
| Zero solution | 2.35457 | 0 | 0 | 2.35457 | 2.35457 | |
| Plus solution | 4.85457 | 0 | 0 | 4.85457 | 4.85457 | |
| Minus solution | −4.31242 | 0 | 0 | −4.31242 | −4.31242 | B R Pair solutions |
| Zero solution | −1.81242 | 0 | 0 | −1.81242 | −1.81242 | |
| Plus solution | 0.687576 | 0 | 0 | 0.687576 | 0.687576 | |
| Minus solution | −0.605698 | 0 | 0 | −0.605698 | −0.605698 | B S Pair solutions |
| Zero solution | 1.8943 | 0 | 0 | 1.8943 | 1.8943 | |

TABLE 4-continued

Each item is in the order that it was added to the solution set.

| Solution type | Kerning value | left count | left count | left value | right value | |
|---|---|---|---|---|---|---|
| Plus solution | 4.3943 | 0 | 0 | 4.3943 | 4.3943 | |
| Minus solution | −2.07687 | 0 | 0 | −2.07687 | −2.07687 | B T Pair solutions |
| Zero solution | 0.423126 | 0 | 0 | 0.423126 | 0.423126 | |
| Plus solution | 2.92313 | 0 | 0 | 2.92313 | 2.92313 | |
| Minus solution | −5.04272 | 0 | 0 | −5.04272 | −5.04272 | B U Pair solutions |
| Zero solution | −2.54272 | 0 | 0 | −2.54272 | −2.54272 | |
| Plus solution | −0.0427246 | 0 | 0 | −0.0427246 | −0.0427246 | |
| Minus solution | −3.27298 | 0 | 0 | −3.27298 | −3.27298 | B V Pair solutions |
| Zero solution | −0.77298 | 0 | 0 | −0.77298 | −0.77298 | |
| Plus solution | 1.72702 | 0 | 0 | 1.72702 | 1.72702 | |
| Minus solution | −4.02602 | 0 | 0 | −4.02602 | −4.02602 | B W Pair solutions |
| Zero solution | −1.52602 | 0 | 0 | −1.52602 | −1.52602 | |
| Plus solution | 0.973984 | 0 | 0 | 0.973984 | 0.973984 | |
| Minus solution | −4.63205 | 0 | 0 | −4.63205 | −4.63205 | B X Pair solutions |
| Zero solution | −2.13205 | 0 | 0 | −2.13205 | −2.13205 | |
| Plus solution | 0.36795 | 0 | 0 | 0.36795 | 0.36795 | |
| Minus solution | −6.69005 | 0 | 0 | −6.69005 | −6.69005 | B Y Pair solutions |
| Zero solution | −4.19005 | 0 | 0 | −4.19005 | −4.19005 | |
| Plus solution | −1.69005 | 0 | 0 | −1.69005 | −1.69005 | |
| Minus solution | −4.75719 | 0 | 0 | −4.75719 | −4.75719 | B Z Pair solutions |
| Zero solution | −2.25719 | 0 | 0 | −2.25719 | −2.25719 | |
| Plus solution | 0.242813 | 0 | 0 | 0.242813 | 0.242813 | |

The present invention may operate well with only "zero" solutions, however, the "plus" and/or "minus" solutions often produce enhanced solutions for the spacing of some characters, as will be described below.

As may be seen, the original inputted data of Table 1 has now been transformed to the data in Tables 3 and 4. The data in Table 3 pertains to the kerning group associated with character "A", while the data in Table 4 pertains to the kerning group associated with character "B".

After step 72, step 73 sorts the solution set lists in Tables 3 and 4 by kerning values. The results of this sorting step are illustrated in Tables 5 and 6, which correspond to Tables 3 and 4, respectively.

TABLE 5

| Solution type | Kerning value | left count | left count | left value | right value |
|---|---|---|---|---|---|
| Minus solution | −18.1762 | 0 | 0 | −18.1762 | −18.1762 |
| Minus solution | −17.3577 | 0 | 0 | −17.3577 | −17.3577 |
| Zero solution | −15.6762 | 0 | 0 | −15.6762 | −15.6762 |
| Minus solution | −15.3725 | 0 | 0 | −15.3725 | −15.3725 |
| Zero solution | −14.8577 | 0 | 0 | −14.8577 | −14.8577 |
| Plus solution | −13.1762 | 0 | 0 | −13.1762 | −13.1762 |
| Zero solution | −12.8725 | 0 | 0 | −12.8725 | −12.8725 |
| Plus solution | −12.3577 | 0 | 0 | −12.3577 | −12.3577 |
| Minus solution | −10.9503 | 0 | 0 | −10.9503 | −10.9503 |
| Plus solution | −10.3725 | 0 | 0 | −10.3725 | −10.3725 |
| Minus solution | −9.6628 | 0 | 0 | −9.6628 | −9.6628 |
| Minus solution | −9.22377 | 0 | 0 | −9.22377 | −9.22377 |
| Minus solution | −9.18478 | 0 | 0 | −9.18478 | −9.18478 |
| Minus solution | −9.03224 | 0 | 0 | −9.03224 | −9.03224 |
| Zero solution | −8.45033 | 0 | 0 | −8.45033 | −8.45033 |
| Minus solution | −7.83211 | 0 | 0 | −7.83211 | −7.83211 |
| Zero solution | −7.1628 | 0 | 0 | −7.1628 | −7.1628 |
| Zero solution | −6.72377 | 0 | 0 | −6.72377 | −6.72377 |
| Zero solution | −6.68478 | 0 | 0 | −6.68478 | −6.68478 |
| Zero solution | −6.53224 | 0 | 0 | −6.53224 | −6.53224 |
| Plus solution | −5.95033 | 0 | 0 | −5.95033 | −5.95033 |
| Zero solution | −5.33211 | 0 | 0 | −5.33211 | −5.33211 |
| Plus solution | −4.6628 | 0 | 0 | −4.6628 | −4.6628 |
| Plus solution | −4.22377 | 0 | 0 | −4.22377 | −4.22377 |
| Plus solution | −4.18478 | 0 | 0 | −4.18478 | −4.18478 |
| Plus solution | −4.03224 | 0 | 0 | −4.03224 | −4.03224 |
| Minus solution | −3.81534 | 0 | 0 | −3.81534 | −3.81534 |
| Plus solution | −2.83211 | 0 | 0 | −2.83211 | −2.83211 |
| Zero solution | −1.31534 | 0 | 0 | −1.31534 | −1.31534 |
| Plus solution | 1.18466 | 0 | 0 | 1.18466 | 1.18466 |
| Minus solution | 2.40298 | 0 | 0 | 2.40298 | 2.40298 |
| Minus solution | 2.68051 | 0 | 0 | 2.68051 | 2.68051 |
| Minus solution | 3.80136 | 0 | 0 | 3.80136 | 3.80136 |
| Minus solution | 3.97282 | 0 | 0 | 3.97282 | 3.97282 |

TABLE 5-continued

| Solution type | Kerning value | count | left count | left value | right value |
|---|---|---|---|---|---|
| Minus solution | 4.2135 | 0 | 0 | 4.2135 | 4.2135 |
| Minus solution | 4.69453 | 0 | 0 | 4.69453 | 4.69453 |
| Zero solution | 4.90298 | 0 | 0 | 4.90298 | 4.90298 |
| Minus solution | 4.9129 | 0 | 0 | 4.9129 | 4.9129 |
| Minus solution | 4.94185 | 0 | 0 | 4.94185 | 4.94185 |
| Minus solution | 4.95654 | 0 | 0 | 4.95654 | 4.95654 |
| Zero solution | 5.18051 | 0 | 0 | 5.18051 | 5.18051 |
| Minus solution | 5.22591 | 0 | 0 | 5.22591 | 5.22591 |
| Minus solution | 5.29602 | 0 | 0 | 5.29602 | 5.29602 |
| Minus solution | 5.63112 | 0 | 0 | 5.63112 | 5.63112 |
| Minus solution | 5.86601 | 0 | 0 | 5.86601 | 5.86601 |
| Minus solution | 6.05779 | 0 | 0 | 6.05779 | 6.05779 |
| Zero solution | 6.30136 | 0 | 0 | 6.30136 | 6.30136 |
| Zero solution | 6.47282 | 0 | 0 | 6.47282 | 6.47282 |
| Zero solution | 6.7135 | 0 | 0 | 6.7135 | 6.7135 |
| Minus solution | 6.71584 | 0 | 0 | 6.71584 | 6.71584 |
| Zero solution | 7.19453 | 0 | 0 | 7.19453 | 7.19453 |
| Plus solution | 7.40298 | 0 | 0 | 7.40296 | 7.40298 |
| Zero solution | 7.4129 | 0 | 0 | 7.4129 | 7.4129 |
| Zero solution | 7.44185 | 0 | 0 | 7.44185 | 7.44185 |
| Zero solution | 7.45654 | 0 | 0 | 7.45654 | 7.45654 |
| Plus solution | 7.68051 | 0 | 0 | 7.68051 | 7.68051 |
| Zero solution | 7.72591 | 0 | 0 | 7.72591 | 7.72591 |
| Zero solution | 7.79602 | 0 | 0 | 7.79602 | 7.79602 |
| Zero solution | 8.13112 | 0 | 0 | 8.13112 | 8.13112 |
| Minus solution | 8.19658 | 0 | 0 | 8.19658 | 8.19658 |
| Zero solution | 8.36601 | 0 | 0 | 8.36601 | 8.36601 |
| Zero solution | 8.55779 | 0 | 0 | 8.55779 | 8.55779 |
| Plus solution | 8.80136 | 0 | 0 | 8.80136 | 8.80136 |
| Plus solution | 8.97282 | 0 | 0 | 8.97282 | 8.97282 |
| Plus solution | 9.2135 | 0 | 0 | 9.2135 | 9.2135 |
| Zero solution | 9.21584 | 0 | 0 | 9.21584 | 9.21584 |
| Plus solution | 9.69453 | 0 | 0 | 9.69453 | 9.69453 |
| Plus solution | 9.9129 | 0 | 0 | 9.9129 | 9.9129 |
| Plus solution | 9.94185 | 0 | 0 | 9.94185 | 9.94185 |
| Plus solution | 9.95654 | 0 | 0 | 9.95654 | 9.95654 |
| Plus solution | 10.2259 | 0 | 0 | 10.2259 | 10.2259 |
| Plus solution | 10.296 | 0 | 0 | 10.296 | 10.296 |
| Plus solution | 10.6311 | 0 | 0 | 10.6311 | 10.6311 |
| Zero solution | 10.6966 | 0 | 0 | 10.6966 | 10.6966 |
| Plus solution | 10.866 | 0 | | 10.866 | 10.866 |

TABLE 6

| Solution type | Kerning value | count | left count | left value | right value |
|---|---|---|---|---|---|
| Minus solution | −6.69005 | 1 | 0 | −4.19005 | −4.19005 |
| Minus solution | −5.7204 | 2 | 0 | −4.19005 | −3.2204 |
| Minus solution | −5.44435 | 3 | 0 | −4.19005 | −2.94435 |
| Minus solution | −5.04272 | 4 | 0 | −4.19005 | −2.54272 |
| Minus solution | −4.98825 | 5 | 0 | −4.19005 | −2.48825 |
| Minus solution | −4.87375 | 6 | 0 | −4.19005 | −2.37375 |
| Minus solution | −4.75719 | 7 | 0 | −4.19005 | −2.25719 |
| Minus solution | −4.63701 | 8 | 0 | −4.19005 | −2.13701 |
| Minus solution | −4.63205 | 9 | 0 | −4.19005 | −2.13205 |
| Minus solution | −4.46576 | 10 | 0 | −4.19005 | −1.96576 |
| Minus solution | −4.41383 | 11 | 0 | −4.19005 | −1.91383 |
| Minus solution | −4.38956 | 12 | 0 | −4.19005 | −1.88956 |
| Minus solution | −4.38824 | 13 | 0 | −4.19005 | −1.88824 |
| Minus solution | −4.31242 | 14 | 0 | −4.19005 | −1.81242 |
| Minus solution | −4.24623 | 15 | 0 | −4.19005 | −1.74623 |
| Zero solution | −4.19005 | 15 | 1 | −4.19005 | −1.74623 |
| Minus solution | −4.06644 | 16 | 1 | −4.19005 | −1.56644 |
| Minus solution | −4.02602 | 17 | 1 | −4.19005 | −1.52602 |
| Minus solution | −3.27298 | 18 | 1 | −4.19005 | −0.77298 |
| Zero solution | −3.2204 | 18 | 2 | −4.19005 | −0.77298 |
| Minus solution | −3.15666 | 19 | 2 | −4.19005 | −0.656662 |
| Zero solution | −2.94435 | 19 | 3 | −4.19005 | −0.656662 |
| Minus solution | −2.65511 | 20 | 3 | 4.19005 | −0.155106 |
| Zero solution | −2.54272 | 20 | 4 | −4.19005 | −0.155106 |
| Zero solution | −2.48825 | 20 | 5 | −4.19005 | −0.155106 |
| Zero solution | −2.37375 | 20 | 6 | −4.19005 | −0.155106 |
| Zero solution | −2.25719 | 20 | 7 | 4.19005 | −0.155106 |

TABLE 6-continued

| Solution type | Kerning value | count | left count | left value | right value |
|---|---|---|---|---|---|
| Zero solution | −2.13701 | 20 | 8 | 4.19005 | −0.155106 |
| Zero solution | −2.13205 | 20 | 9 | 4.19005 | −0.155106 |
| Minus solution | −2.07687 | 21 | 9 | −4.19005 | 0.423126 |
| Zero solution | −1.96576 | 21 | 10 | −4.19005 | 0.423126 |
| Zero solution | −1.91383 | 21 | 11 | −4.19005 | 0.423126 |
| Zero solution | −1.88956 | 21 | 12 | −4.19005 | 0.423126 |
| Zero solution | −1.88824 | 21 | 13 | −4.19005 | 0.423126 |
| Zero solution | −1.81242 | 21 | 14 | −4.19005 | 0.423126 |
| Zero solution | −1.74623 | 21 | 15 | −4.19005 | 0.423126 |
| Plus solution | −1.69005 | 21 | 15 | −4.19005 | 0.423126 |
| Zero solution | −1.56644 | 20 | 15 | −3.2204 | 0.423126 |
| Zero solution | −1.52602 | 20 | 16 | −3.2204 | 0.423126 |
| Zero solution | −0.77298 | 20 | 17 | −3.2204 | 0.423126 |
| Plus solution | −0.720398 | 20 | 17 | −3.2204 | 0.423126 |
| Zero solution | −0.656662 | 19 | 17 | −2.94435 | 0.423126 |
| Minus solution | −0.605698 | 20 | 17 | −2.94435 | 1.8943 |
| Plus solution | −0.444351 | 20 | 17 | −2.94435 | 1.8943 |
| Minus solution | −0.433609 | 20 | 16 | −2.54272 | 2.06639 |
| Minus solution | −0.232544 | 21 | 16 | −2.54272 | 2.26746 |
| Minus solution | −0.196091 | 22 | 16 | −2.54272 | 2.30391 |
| Zero solution | −0.155106 | 22 | 17 | −2.54272 | 2.30391 |
| Minus solution | −0.145432 | 23 | 17 | −2.54272 | 2.35457 |
| Plus solution | −0.0427246 | 23 | 17 | −2.54272 | 2.35457 |
| Plus solution | 0.0117493 | 22 | 16 | −2.48825 | 2.35457 |
| Plus solution | 0.126251 | 21 | 15 | −2.37375 | 2.35457 |
| Plus solution | 0.242813 | 20 | 14 | −2.25719 | 2.35457 |
| Plus solution | 0.362991 | 19 | 13 | −2.13701 | 2.35457 |
| Plus solution | 0.36795 | 18 | 12 | −2.13205 | 2.35457 |
| Zero solution | 0.423126 | 17 | 12 | −1.96576 | 2.35457 |
| Plus solution | 0.534241 | 17 | 12 | −1.96576 | 2.35457 |
| Plus solution | 0.586166 | 16 | 11 | −1.91383 | 2.35457 |
| Plus solution | 0.610443 | 15 | 10 | −1.88956 | 2.35457 |
| Plus solution | 0.611755 | 14 | 9 | −1.88824 | 2.35457 |
| Plus solution | 0.687576 | 13 | 8 | −1.81242 | 2.35457 |
| Plus solution | 0.753769 | 12 | 7 | −1.74623 | 2.35457 |
| Plus solution | 0.933563 | 11 | 6 | −1.56644 | 2.35457 |
| Plus solution | 0.973984 | 10 | 5 | −1.52602 | 2.35457 |
| Plus solution | 1.72702 | 9 | 4 | −0.77298 | 2.35457 |
| Plus solution | 1.84334 | 8 | 3 | −0.656662 | 2.35457 |
| Zero solution | 1.8943 | 7 | 3 | −0.155106 | 2.35457 |
| Zero solution | 2.06639 | 7 | 4 | −0.155106 | 2.35457 |
| Zero solution | 2.26746 | 7 | 5 | −0.155106 | 2.35457 |
| Zero solution | 2.30391 | 7 | 6 | −0.155106 | 2.35457 |
| Plus solution | 2.34489 | 7 | 6 | −0.155106 | 2.35457 |
| Zero solution | 2.35457 | 6 | 6 | 0.423126 | 2.35457 |
| Plus solution | 2.92313 | 6 | 6 | 0.423126 | 2.35457 |
| Plus solution | 4.3943 | 5 | 5 | 1.8943 | 2.35457 |
| Plus solution | 4.56639 | 4 | 4 | 2.06639 | 2.35457 |
| Plus solution | 4.76746 | 3 | 3 | 2.26746 | 2.35457 |
| Plus solution | 4.80391 | 2 | 2 | 2.30391 | 2.35457 |
| Plus solution | 4.85457 | 1 | 1 | 2.35457 | 2.35457 |

Thus, Table 5 corresponds to the kerning group associated with character "A" as the first character of each pair, while Table 6 corresponds to the kerning group with character "B" as the first character of each pair.

Though not necessary, sorting step 73 makes it easier for subsequent steps by sorting the solution set lists by placing smaller kerning values before larger kerning values, i.e. sorting by increasing kerning value.

Figure 8:
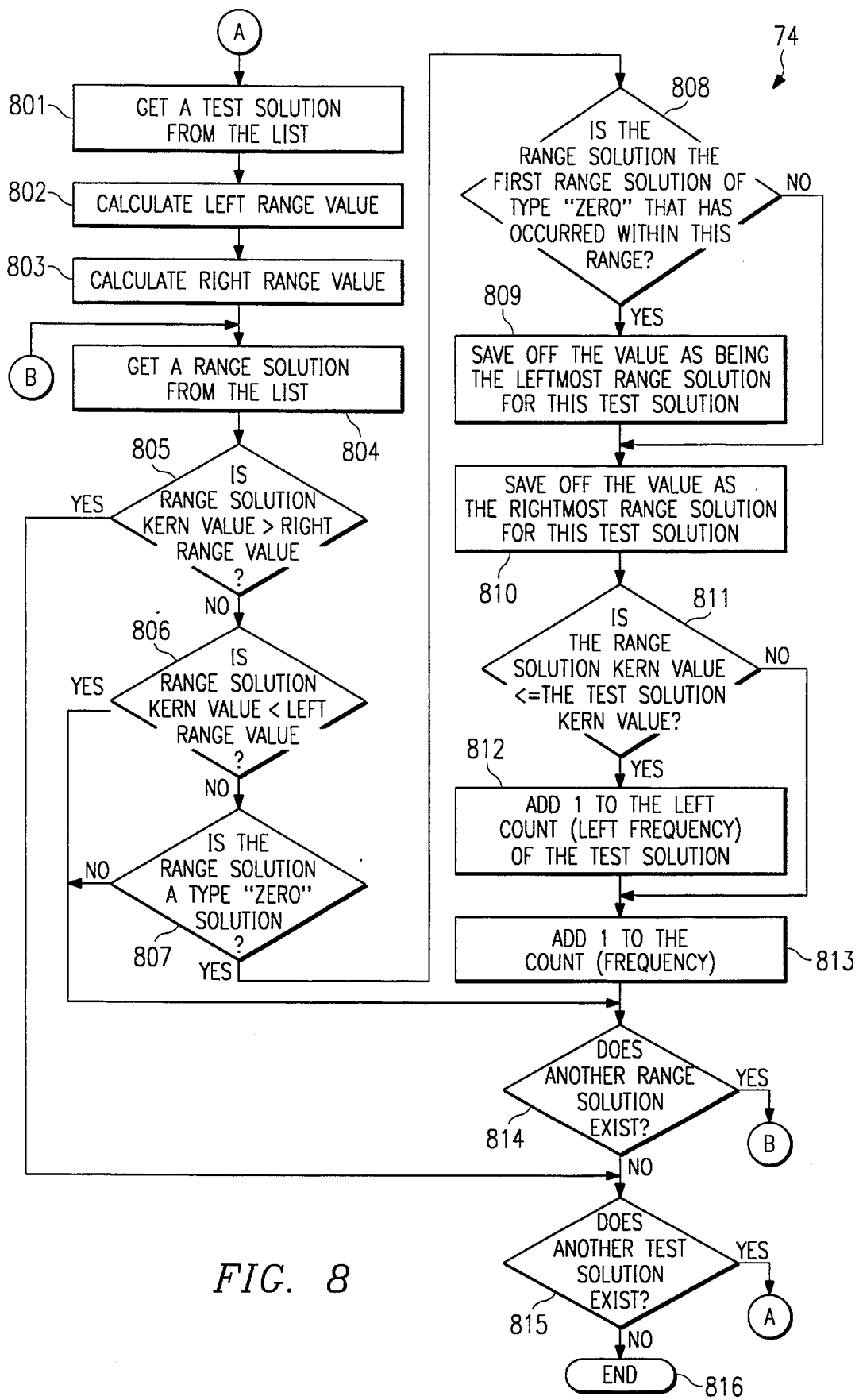
FIG. 8 illustrates the "get frequency" subprocess within the present invention.

After step 73, the process illustrated in FIG. 7 proceeds to step 74 to execute the "get frequency" subprocess further illustrated in FIG. 8.

Referring next to FIG. 8, the "get frequency" subprocess (step 74) is illustrated in further detail. This subprocess assists in determining which of the aforementioned "minus," "zero," or "plus" solutions are the best solutions for spacing each of the characters within each kerning pair group (in this example, characters "A" & "B"), within a predefined margin of error (e.g., 2.5).

For illustration purposes, the subprocess within FIG. 8 will only be discussed with respect to the information in Table 5, which is the solution set for the kerning group having as its first character, character "A". However, the subprocess also applies to the character "B" group. As noted above, the information in Table 5 has been sorted by kerning values (step 73).

In step 801, the first test solution within the listed information illustrated in Table 5 is retrieved. Thereafter, in step 802, a left range value is computed by subtracting the aforementioned margin of error from the test solution kerning value. In this case, the first test solution from Table 5 is the "minus" solution having a kerning value of −18.1762. The resultant left range value becomes −18.1762−2.5, which is equal to −20.6762. Thereafter, in step 803, a right range value is similarly computed by adding the margin of error (2.5 units) to the test solution kerning value of −18.1762 to arrive at −15.6762.

Next, in step 804, a "range solution" is obtained from the list in Table 5. Essentially, the obtained range solutions are the same as the aforementioned test solutions. Therefore, in step 804, the first solution, the "minus" solution, with a kerning value of −18.1762 is obtained from the list.

Thereafter, in step 805, a decision is made on whether or not this range solution has a kerning value greater than the aforementioned computed right range value. If so, the subprocess proceeds to step 815; if not, the subprocess proceeds to step 806. In this example, the range solution kerning value of −18.1762 is not greater than the right range value computed in step 803 (−15.6762 units). Therefore, the subprocess proceeds to step 806, to determine whether or not the range solution kern value of −18.1762 is less than the left range value computed in step 802 (−20.6762 units). If true, the subprocess proceeds to step 814; if false, the subprocess proceeds to step 807. In this example, −18.1762 is not less than −20.6762, therefore the subprocess proceeds to step 807 to determine whether or not this range solution is a "zero" solution. If it is, the subprocess proceeds to step 808; if it is not a "zero" solution, the subprocess proceeds to step 814.

In this example, this range solution is designated as a "minus" solution, therefore, the subprocess in FIG. 8 proceeds to step 814, which determines whether or not another range solution within the kerning group list of Table 5 exists. If another range solution did not exist, the subprocess would proceed to step 815. However, since there is another range solution, the subprocess returns to step 804 to retrieve another range solution from the list, in this case the "minus" solution having a kerning value of −17.3577.

Thereafter, in step 805, a comparison of this range solution kerning value is made with the right range value calculated in step 803. Since −17.3577 is less than the right range value of −15.6762, the subprocess proceeds to step 806 to then compare this range solution kerning value to the aforementioned left range value. Since −17.3577 is not less than the left range value of −20.6762, the subprocess proceeds to step 807 to determine whether or not this range solution is a type "zero" solution. Since the solution type associated with the kerning value of −17.3577 is a "minus" solution, the subprocess again proceeds to step 814 to determine whether or not another range solution exists within the solution set.

Since another range solution does exist, the subprocess again returns to step 804 to retrieve another range solution from the list, in this case, the "zero" solution having a kerning value of −15.6762. Next, in step 805, this range solution kerning value is compared to the aforementioned right range value. Since −15.6762 is equal to the right range value of −15.6762, it is therefore not greater than this right range value, and the subprocess in FIG. 8 proceeds to step 806 to compare this range solution kerning value to the aforementioned left range value of −20.6762.

Since −15.6762 is greater than −20.6762, the subprocess proceeds to step 807 to determine whether or not this range solution is a type "zero" solution. Since it is, the process proceeds to step 808 wherein the subprocess determines whether or not this range solution is the first range solution of a type "zero" that has occurred within this particular range of values, i.e., between the left and right range values computed within steps 802 and 803. If it is not the first of type "zero," the subprocess proceeds to step 810. However, since this is the first "zero" solution within this range, the subprocess proceeds to step 809 to save this range solution kerning value as being the left-most range solution for this test solution.

Please refer to the first entry within Table 7 below, wherein the first test solution is designated as the "minus" solution having a kerning value of −18.1762, which is the test solution that was first retrieved within step 801 above. It may be noted that the left value in this entry is equal to −15.6762, i.e., the left-most range solution designated in step 809.

Thereafter, in step 810, this value is also saved as the right-most range solution for this test solution. Next, in step 811, the subprocess of FIG. 8 determines whether or not this range solution kerning value is less than or equal to the test solution kerning value of the test solution retrieved in step 801. If not, the subprocess proceeds to step 813; if the answer is positive, the subprocess proceeds to step 812.

Since in this example, the range solution kerning value of −15.6762 is greater than the test solution kerning value of −18.1762, the subprocess proceeds to step 813 to add 1 to the "count" (frequency) for this test solution. The significance of this count value will be discussed below.

Thereafter, in step 814, the subprocess in FIG. 8 determines whether or not another range solution exists. If not, a determination of whether or not another test solution exists would be made in step 815. However, since there is another range solution within Table 5, the subprocess returns to step 804 to retrieve another range solution from the list. This next range solution is designated as a "minus" solution having a kerning value of −15.3725. In step 805, since this kerning value is greater than the right range value of −15.672, the subprocess proceeds to step 815 to retrieve another test solution from the solution set, if one exists. Since one does exist, the subprocess returns to step 801 to retrieve another test solution from the list; in this example, this next test solution is the second entry within Table 5, i.e., the test solution designated as the "minus" solution having a kerning value of −17.3577.

If one follows the subprocess illustrated in FIG. 8 for each test solution within Table 5, the items and values in Table 7 will be derived.

TABLE 7

| Solution type | Kerning value | count | left count | left value | right value |
|---|---|---|---|---|---|
| Minus solution | −18.1762 | 1 | 0 | −15.6762 | −15.6762 |
| Minus solution | −17.3577 | 2 | 0 | −15.6762 | −14.8577 |
| Zero solution | −15.6762 | 2 | 1 | −15.6762 | −14.8577 |
| Minus solution | −15.3725 | 3 | 1 | −15.6762 | −12.8725 |
| Zero solution | −14.8577 | 3 | 2 | −15.6762 | −12.8725 |
| Plus solution | −13.1762 | 3 | 2 | −15.6762 | −12.8725 |
| Zero solution | −12.8725 | 2 | 2 | −14.8577 | −12.8725 |
| Plus solution | −12.3577 | 2 | 2 | −14.8577 | −12.8725 |
| Minus solution | −10.9503 | 2 | 1 | −12.8725 | −8.45033 |
| Plus solution | −10.3725 | 2 | 1 | −12.8725 | −8.45033 |
| Minus solution | −9.6628 | 2 | 0 | −8.45033 | −7.1628 |
| Minus solution | −9.22377 | 3 | 0 | −8.45033 | −6.72377 |

TABLE 7-continued

| Solution type | Kerning value | left count | left count | left value | right value |
|---|---|---|---|---|---|
| Minus solution | −9.18478 | 4 | 0 | −8.45033 | −6.68478 |
| Minus solution | −9.03224 | 5 | 0 | −8.45033 | −6.53224 |
| Zero solution | −8.45033 | 5 | 1 | −8.45033 | −6.53224 |
| Minus solution | −7.83211 | 6 | 1 | −8.45033 | −5.33211 |
| Zero solution | −7.1628 | 6 | 2 | −8.45033 | −5.33211 |
| Zero solution | −6.72377 | 6 | 3 | −8.45033 | −5.33211 |
| Zero solution | −6.68478 | 6 | 4 | −8.45033 | −5.33211 |
| Zero solution | −6.53224 | 6 | 5 | −8.45033 | −5.33211 |
| Plus solution | −5.95033 | 6 | 5 | −8.45033 | −5.33211 |
| Zero solution | −5.33211 | 5 | 5 | −7.1628 | −5.33211 |
| Plus solution | −4.6628 | 5 | 5 | −7.1628 | −5.33211 |
| Plus solution | −4.22377 | 4 | 4 | −6.72377 | −5.33211 |
| Plus solution | −4.18478 | 3 | 3 | −6.68478 | −5.33211 |
| Plus solution | −4.03224 | 2 | 2 | −6.53224 | −5.33211 |
| Minus solution | −3.81534 | 2 | 1 | −5.33211 | −1.31534 |
| Plus solution | −2.83211 | 2 | 1 | −5.33211 | −1.31534 |
| Zero solution | −1.31534 | 1 | 1 | −1.31534 | −1.31534 |
| Plus solution | 1.18466 | 1 | 1 | −1.31534 | −1.31534 |
| Minus solution | 2.40298 | 1 | 0 | 4.90298 | 4.90298 |
| Minus solution | 2.68051 | 2 | 0 | 4.90298 | 5.18051 |
| Minus solution | 3.80136 | 3 | 0 | 4.90298 | 6.30136 |
| Minus solution | 3.97282 | 4 | 0 | 4.90298 | 6.47282 |
| Minus solution | 4.2135 | 5 | 0 | 4.90298 | 6.7135 |
| Minus solution | 4.69453 | 6 | 0 | 4.90298 | 7.19453 |
| Zero solution | 4.90298 | 6 | 1 | 4.90298 | 7.19453 |
| Minus solution | 4.9129 | 7 | 1 | 4.90298 | 7.4129 |
| Minus solution | 4.94185 | 8 | 1 | 4.90298 | 7.44185 |
| Minus solution | 4.95654 | 9 | 1 | 4.90298 | 7.45654 |
| Zero solution | 5.18051 | 9 | 2 | 4.90298 | 7.45654 |
| Minus solution | 5.22591 | 10 | 2 | 4.90298 | 7.72591 |
| Minus solution | 5.29602 | 11 | 2 | 4.90298 | 7.79602 |
| Minus solution | 5.63112 | 12 | 2 | 4.90298 | 8.13112 |
| Minus solution | 5.86601 | 13 | 2 | 4.90298 | 8.36601 |
| Minus solution | 6.05779 | 14 | 2 | 4.90298 | 8.55779 |
| Zero solution | 6.30136 | 14 | 3 | 4.90298 | 8.55779 |
| Zero solution | 6.47282 | 14 | 4 | 4.90298 | 8.55779 |
| Zero solution | 6.7135 | 14 | 5 | 4.90298 | 8.55779 |
| Minus solution | 6.71584 | 15 | 5 | 4.90298 | 9.21584 |
| Zero solution | 7.19453 | 15 | 6 | 4.90298 | 9.21584 |
| Plus solution | 7.40298 | 15 | 6 | 4.90298 | 9.21584 |
| Zero solution | 7.4129 | 14 | 6 | 5.18051 | 9.21584 |
| Zero solution | 7.44185 | 14 | 7 | 5.18051 | 9.21584 |
| Zero solution | 7.45654 | 14 | 8 | 5.18051 | 9.21584 |
| Plus solution | 7.68051 | 14 | 8 | 5.18051 | 9.21584 |
| Zero solution | 7.72591 | 13 | 8 | 6.30136 | 9.21584 |
| Zero solution | 7.79602 | 13 | 9 | 6.30136 | 9.21584 |
| Zero solution | 8.13112 | 13 | 10 | 6.30136 | 9.21584 |
| Minus solution | 8.19658 | 14 | 10 | 6.30136 | 10.6966 |
| Zero solution | 8.36601 | 14 | 11 | 6.30136 | 10.6966 |
| Zero solution | 8.55779 | 14 | 12 | 6.30136 | 10.6966 |
| Plus solution | 8.80136 | 14 | 12 | 6.30136 | 10.6966 |
| Plus solution | 8.97282 | 13 | 11 | 6.47282 | 10.6966 |
| Plus solution | 9.2135 | 12 | 10 | 6.7135 | 10.6966 |
| Zero solution | 9.21584 | 11 | 10 | 7.19453 | 10.6966 |
| Plus solution | 9.69453 | 11 | 10 | 7.19453 | 10.6966 |
| Plus solution | 9.9129 | 10 | 9 | 7.4129 | 10.6966 |
| Plus solution | 9.94185 | 9 | 8 | 7.44185 | 10.6966 |
| Plus solution | 9.95654 | 8 | 7 | 7.45654 | 10.6966 |
| Plus solution | 10.2259 | 7 | 6 | 7.72591 | 10.6966 |
| Plus solution | 10.296 | 6 | 5 | 7.79602 | 10.6966 |
| Plus solution | 10.6311 | 5 | 4 | 8.13112 | 10.6966 |
| Zero solution | 10.6966 | 4 | 4 | 8.36601 | 10.6966 |
| Plus solution | 10.866 | 4 | 4 | 8.36601 | 10.6966 |
| Plus solution | 11.0578 | 3 | 3 | 8.55779 | 10.6966 |
| Plus solution | 11.7158 | 2 | 2 | 9.21584 | 10.6966 |
| Plus solution | 13.1966 | 1 | 1 | 10.6966 | 10.6966 |

Correspondingly, the test solution items in Table 6 will be derived by the subprocess in FIG. 8 into the items in Table 8 for the group corresponding to character "B".

TABLE 8

| Solution type | Kerning value | count | left count | left value | right value |
|---|---|---|---|---|---|
| Minus solution | −6.69005 | 1 | 0 | −4.19005 | −4.19005 |
| Minus solution | −5.7204 | 2 | 0 | −4.19005 | −3.2204 |
| Minus solution | −5.44435 | 3 | 0 | −4.19005 | −2.94435 |
| Minus solution | −5.04272 | 4 | 0 | −4.19005 | −2.54272 |
| Minus solution | −4.98825 | 5 | 0 | −4.19005 | −2.48825 |
| Minus solution | −4.87375 | 6 | 0 | −4.19005 | −2.37375 |
| Minus solution | −4.75719 | 7 | 0 | −4.19005 | −2.25719 |
| Minus solution | −4.63701 | 8 | 0 | −4.19005 | −2.13701 |
| Minus solution | −4.63205 | 9 | 0 | −4.19005 | −2.13205 |
| Minus solution | −4.46576 | 10 | 0 | −4.19005 | −1.96576 |
| Minus solution | −4.41383 | 11 | 0 | −4.19005 | −1.91383 |
| Minus solution | −4.38956 | 12 | 0 | −4.19005 | −1.88956 |
| Minus solution | −4.38824 | 13 | 0 | −4.19005 | −1.88824 |
| Minus solution | −4.31242 | 14 | 0 | −4.19005 | −1.81242 |
| Minus solution | −4.24623 | 15 | 0 | −4.19005 | −1.74623 |
| Zero solution | −4.19005 | 15 | 1 | −4.19005 | −1.74623 |
| Minus solution | −4.06644 | 16 | 1 | −4.19005 | −1.56644 |
| Minus solution | −4.02602 | 17 | 1 | −4.19005 | −1.52602 |
| Minus solution | −3.27298 | 18 | 1 | −4.19005 | −0.77298 |
| Zero solution | −3.2204 | 18 | 2 | −4.19005 | −0.77298 |
| Minus solution | −3.15666 | 19 | 2 | −4.19005 | −0.656662 |
| Zero solution | −2.94435 | 19 | 3 | −4.19005 | −0.656662 |
| Minus solution | −2.65511 | 20 | 3 | −4.19005 | −0.155106 |
| Zero solution | −2.54272 | 20 | 4 | −4.19005 | −0.155106 |
| Zero solution | −2.48825 | 20 | 5 | −4.19005 | −0.155106 |
| Zero solution | −2.37375 | 20 | 6 | −4.19005 | −0.155106 |
| Zero solution | −2.25719 | 20 | 7 | −4.19005 | −0.155106 |
| Zero solution | −2.13701 | 20 | 8 | −4.19005 | −0.155106 |
| Zero solution | −2.13205 | 20 | 9 | −4.19005 | −0.155106 |
| Minus solution | −2.07687 | 21 | 9 | −4.19005 | 0.423126 |
| Zero solution | −1.96576 | 21 | 10 | −4.19005 | 0.423126 |
| Zero solution | −1.91383 | 21 | 11 | −4.19005 | 0.423126 |
| Zero solution | −1.88956 | 21 | 12 | −4.19005 | 0.423126 |
| Zero solution | −1.88824 | 21 | 13 | −4.19005 | 0.423126 |
| Zero solution | −1.81242 | 21 | 14 | −4.19005 | 0.423126 |
| Zero solution | −1.74623 | 21 | 15 | −4.19005 | 0.423126 |
| Plus solution | −1.69005 | 21 | 15 | −4.19005 | 0.423126 |
| Zero solution | −1.56644 | 20 | 15 | −3.2204 | 0.423126 |
| Zero solution | −1.52602 | 20 | 16 | −3.2204 | 0.423126 |
| Zero solution | −0.77298 | 20 | 17 | −3.2204 | 0.423126 |
| Plus solution | −0.720398 | 20 | 17 | −3.2204 | 0.423126 |
| Zero solution | −0.656662 | 19 | 17 | −2.94435 | 0.423126 |
| Minus solution | −0.605698 | 20 | 17 | −2.94435 | 1.8943 |
| Plus solution | −0.444351 | 20 | 17 | −2.94435 | 1.8943 |
| Minus solution | −0.433609 | 20 | 16 | −2.54272 | 2.06639 |
| Minus solution | −0.232544 | 21 | 16 | −2.54272 | 2.26746 |
| Minus solution | −0.196091 | 22 | 16 | −2.54272 | 2.30391 |
| Zero solution | −0.155106 | 22 | 17 | −2.54272 | 2.30391 |
| Minus solution | −0.145432 | 23 | 17 | −2.54272 | 2.35457 |
| Plus solution | −0.0427246 | 23 | 17 | −2.54272 | 2.35457 |
| Plus solution | 0.0117493 | 22 | 16 | −2.48825 | 2.35457 |
| Plus solution | 0.126251 | 21 | 15 | −2.37375 | 2.35457 |
| Plus solution | 0.242813 | 20 | 14 | −2.25719 | 2.35457 |
| Plus solution | 0.362991 | 19 | 13 | −2.13701 | 2.35457 |
| Plus solution | 0.36795 | 18 | 12 | −2.13205 | 2.35457 |
| Zero solution | 0.423126 | 17 | 12 | −1.96576 | 2.35457 |
| Plus solution | 0.534241 | 17 | 12 | −1.96576 | 2.35457 |
| Plus solution | 0.586166 | 16 | 11 | −1.91383 | 2.35457 |
| Plus solution | 0.610443 | 15 | 10 | −1.88956 | 2.35457 |
| Plus solution | 0.611755 | 14 | 9 | −1.88824 | 2.35457 |
| Plus solution | 0.687576 | 13 | 8 | −1.81242 | 2.35457 |
| Plus solution | 0.753769 | 12 | 7 | −1.74623 | 2.35457 |
| Plus solution | 0.933563 | 11 | 6 | −1.56644 | 2.35457 |
| Plus solution | 0.973984 | 10 | 5 | −1.52602 | 2.35457 |
| Plus solution | 1.72702 | 9 | 4 | −0.77298 | 2.35457 |
| Plus solution | 1.84334 | 8 | 3 | −0.656662 | 2.35457 |
| Zero solution | 1.8943 | 7 | 3 | −0.155106 | 2.35457 |
| Zero solution | 2.06639 | 7 | 4 | −0.155106 | 2.35457 |
| Zero solution | 2.26746 | 7 | 5 | −0.155106 | 2.35457 |
| Zero solution | 2.30391 | 7 | 6 | −0.155106 | 2.35457 |
| Plus solution | 2.34489 | 7 | 6 | −0.155106 | 2.35457 |
| Zero solution | 2.35457 | 6 | 6 | 0.423126 | 2.35457 |
| Plus solution | 2.92313 | 6 | 6 | 0.423126 | 2.35457 |
| Plus solution | 4.3943 | 5 | 5 | 1.8943 | 2.35457 |
| Plus solution | 4.56639 | 4 | 4 | 2.06639 | 2.35457 |
| Plus solution | 4.76746 | 3 | 3 | 2.26746 | 2.35457 |

TABLE 8-continued

| Solution type | Kerning value | count | left count | left value | right value |
|---|---|---|---|---|---|
| Plus solution | 4.80391 | 2 | 2 | 2.30391 | 2.35457 |
| Plus solution | 4.85457 | 1 | 1 | 2.35457 | 2.35457 |

The resultant items in Tables 7 and 8 now show various values for the "count," "left count," "left value," and "right value".

Returning to FIG. 7, after the execution of the subprocess in FIG. 8 (step 74), the subprocess in FIG. 7 then proceeds to step 75 to sort the solution set lists by frequency, or count. Essentially, the "frequency" value, or "count" value, for a given test solution, equates to the number of type "zero" solutions that occurs between the range of values specified by the left range value and the right range value (inclusive).

The "left frequency" value (the item labeled "left count" in Tables 7 and 8) for a given test solution is the number of type "zero" solutions that occurs between the range of values specified by the left range value and the test solution value (inclusive).

The "left value" is the kerning value of the smallest type "zero" solution that occurs between the range of values specified by the left range value and the right range value (inclusive).

The "right value" is the kerning value of the largest type "zero" solution that occurs between the range of values specified by the left range value and the right range value (inclusive).

In step 75, the solution sets of Tables 7 and 8 are sorted by "larger" frequency (count) values coming before "smaller" frequency values. If any count values are also the same, then the smaller solution types come first (i.e., the order of the solution types is as follows: the "zero" solution is the smallest, the "plus" solution is the next smallest, and the "minus" solution is the largest of the three solutions).

Furthermore, if the solution types are also the same, then the solution with the larger left frequency (left count) value comes first.

Moreover, if the left frequency values are also the same, then the solution with the smaller absolute kerning value comes first.

Figure 9:
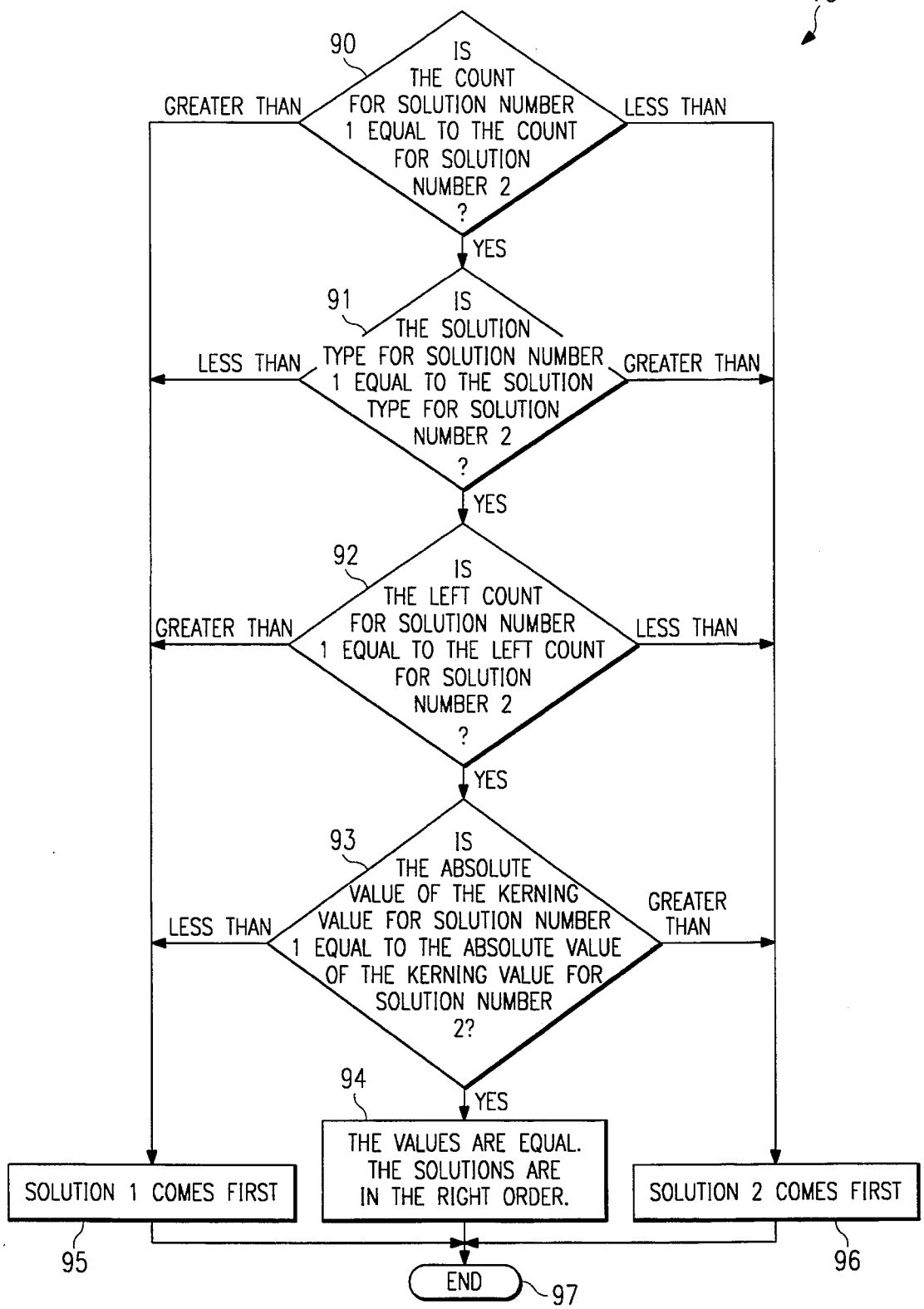
FIG. 9 illustrates a flow diagram for the "sorting by frequency subprocess"

Note that the aforementioned decision process is implemented within steps 90–97 of FIG. 9. The order of some of these steps may be swapped if desired by the user.

Tables 9 and 10 show the solution sets for characters "A" and "B", respectively, after being sorted by step 75.

TABLE 9

| Solution type | Kerning value | count | left count | left value | right value | |
|---|---|---|---|---|---|---|
| Zero solution | 7.19453 | 15 | 6 | 4.90298 | 9.21584 | <-- Item chosen by get |
| Plus solution | 7.40298 | 15 | 6 | 4.90298 | 9.21584 | new width algorithm |
| Minus solution | 6.71584 | 15 | 5 | 4.90298 | 9.21584 | |
| Zero solution | 8.55779 | 14 | 12 | 6.30136 | 10.6966 | |
| Zero solution | 8.36601 | 14 | 11 | 6.30136 | 10.6966 | |
| Zero solution | 7.45654 | 14 | 8 | 5.18051 | 9.21584 | |
| Zero solution | 7.44185 | 14 | 7 | 5.18051 | 9.21584 | |
| Zero solution | 7.4129 | 14 | 6 | 5.18051 | 9.21584 | |
| Zero solution | 6.7135 | 14 | 5 | 4.90298 | 8.55779 | |
| Zero solution | 6.47282 | 14 | 4 | 4.90298 | 8.55779 | |
| Zero solution | 6.30136 | 14 | 3 | 4.90298 | 8.55779 | |
| Plus solution | 8.80136 | 14 | 12 | 6.30136 | 10.6966 | |
| Plus solution | 7.68051 | 14 | 8 | 5.18051 | 9.21584 | |
| Minus solution | 8.19658 | 14 | 10 | 6.30136 | 10.6966 | |
| Minus solution | 6.05779 | 14 | 2 | 4.90298 | 8.55779 | |
| Zero solution | 8.13112 | 13 | 10 | 6.30136 | 9.21584 | |
| Zero solution | 7.79602 | 13 | 9 | 6.30136 | 9.21584 | |
| Zero solution | 7.72591 | 13 | 8 | 6.30136 | 9.21584 | |
| Plus solution | 8.97282 | 13 | 11 | 6.47282 | 0.6966 | |
| Minus solution | 5.86601 | 13 | 2 | 4.90298 | 8.36601 | |
| Plus solution | 9.2135 | 12 | 10 | 6.7135 | 10.6966 | |
| Minus solution | 5.63112 | 12 | 2 | 4.90298 | 8.13112 | |
| Zero solution | 9.21584 | 11 | 10 | 7.19453 | 10.6966 | |
| Plus solution | 9.69453 | 11 | 10 | 7.19453 | 10.6966 | |
| Minus solution | 5.29602 | 11 | 2 | 4.90298 | 7.79602 | |
| Plus solution | 9.9129 | 10 | 9 | 7.4129 | 10.6966 | |
| Plus solution | 5.22591 | 10 | 2 | 4.90298 | 7.72591 | |
| Zero solution | 5.18051 | 9 | 2 | 4.90298 | 7.45654 | |
| Plus solution | 9.94185 | 9 | 8 | 7.44185 | 10.6966 | |
| Minus solution | 4.95654 | 9 | 1 | 4.90298 | 7.45654 | |
| Plus solution | 9.95654 | 8 | 7 | 7.45654 | 10.6966 | |
| Minus solution | 4.94185 | 8 | 1 | 4.90298 | 7.44185 | |
| Plus solution | 10.2259 | 7 | 6 | 7.72591 | 10.6966 | |
| Minus solution | 4.9129 | 7 | 1 | 4.90298 | 7.4129 | |
| Zero solution | −6.53224 | 6 | 5 | −8.45033 | −5.33211 | |
| Zero solution | −6.68478 | 6 | 4 | −8.45033 | −5.33211 | |

TABLE 9-continued

| Solution type | Kerning value | count | left count | left value | right value |
|---|---|---|---|---|---|
| Zero solution | −6.72377 | 6 | 3 | −8.45033 | −5.33211 |
| Zero solution | −7.1628 | 6 | 2 | −8.45033 | −5.33211 |
| Zero solution | 4.90298 | 6 | 1 | 4.90298 | 7.19453 |
| Plus solution | 10.296 | 6 | 5 | 7.79602 | 10.6966 |
| Plus solution | −5.95033 | 6 | 5 | −8.45033 | −5.33211 |
| Minus solution | −7.83211 | 6 | 1 | −8.45033 | −5.33211 |
| Minus solution | 4.69453 | 6 | 0 | 4.90298 | 7.19453 |
| Zero solution | −5.33211 | 5 | 5 | −7.1628 | −5.33211 |
| Zero solution | −8.45033 | 5 | 1 | −8.45033 | −6.53224 |
| Plus solution | −4.6628 | 5 | 5 | −7.1628 | −5.33211 |
| Plus solution | 10.6311 | 5 | 4 | 8.13112 | 10.6966 |
| Minus solution | −9.03224 | 5 | 0 | −8.45033 | −6.53224 |
| Minus solution | 4.2135 | 5 | 0 | 4.90298 | 6.7135 |
| Zero solution | 10.6966 | 4 | 4 | 6.36601 | 10.6966 |
| Plus solution | 10.866 | 4 | 4 | 8.36601 | 10.6966 |
| Plus solution | −4.22377 | 4 | 4 | −6.72377 | −5.33211 |
| Minus solution | −9.18478 | 4 | 0 | −8.45033 | −6.68478 |
| Minus solution | 3.97282 | 4 | 0 | 4.90298 | 6.47282 |
| Zero solution | −14.8577 | 3 | 2 | −15.6762 | −12.8725 |
| Plus solution | 11.0578 | 3 | 3 | 8.55779 | 10.6966 |
| Plus solution | −4.18478 | 3 | 3 | −6.68478 | −5.33211 |
| Plus solution | −13.1762 | 3 | 2 | −15.6762 | −12.8725 |
| Minus solution | −15.3725 | 3 | 1 | −15.6762 | −12.8725 |
| Minus solution | −9.22377 | 3 | 0 | −8.45033 | −6.72377 |
| Minus solution | 3.80136 | 3 | 0 | 4.90298 | 6.30136 |
| Zero solution | −12.8725 | 2 | 2 | −14.8577 | −12.8725 |
| Zero solution | −15.6762 | 2 | 1 | −15.6762 | −14.8577 |
| Plus solution | −4.03224 | 2 | 2 | −6.53224 | −5.33211 |
| Plus solution | −12.3577 | 2 | 2 | −14.8577 | −12.8725 |
| Plus solution | 11.7158 | 2 | 2 | 9.21584 | 10.6966 |
| Plus solution | −2.83211 | 2 | 1 | −5.33211 | −1.31534 |
| Plus solution | −10.3725 | 2 | 1 | −12.8725 | −8.45033 |
| Minus solution | −10.9503 | 2 | 1 | −12.8725 | −8.45033 |
| Minus solution | −3.81534 | 2 | 1 | −5.33211 | −1.31534 |
| Minus solution | 2.68051 | 2 | 0 | 4.90298 | 5.18051 |
| Minus solution | −17.3577 | 2 | 0 | −15.6762 | −14.8577 |
| Minus solution | −9.6628 | 2 | 0 | −8.45033 | −7.1628 |
| Zero solution | −1.31534 | 1 | 1 | −1.31534 | −1.31534 |
| Plus solution | 1.18466 | 1 | 1 | −1.31534 | −1.31534 |
| Plus solution | 13.1966 | 1 | 1 | 10.6966 | 10.6966 |
| Minus solution | −18.1762 | 1 | 0 | −15.6762 | −15.6762 |
| Minus solution | 2.40298 | 1 | 0 | 4.90298 | 4.90298 |

TABLE 10

| Solution type | Kerning value | count | left count | left value | right value | |
|---|---|---|---|---|---|---|
| Plus solution | −0.0427246 | 23 | 17 | −2.54272 | 2.35457 | <-- Item chosen by get |
| Minus solution | −0.145432 | 23 | 17 | −2.54272 | 2.35457 | new width algorithm |
| Zero solution | −0.155106 | 22 | 17 | −2.54272 | 2.30391 | |
| Plus solution | 0.0117493 | 22 | 16 | −2.48825 | 2.35457 | |
| Minus solution | −0.196091 | 22 | 16 | −2.54272 | 2.30391 | |
| Zero solution | −1.74623 | 21 | 15 | −4.19005 | 0.423126 | |
| Zero solution | −1.81242 | 21 | 14 | −4.19005 | 0.423126 | |
| Zero solution | −1.88824 | 21 | 13 | −4.19005 | 0.423126 | |
| Zero solution | −1.88956 | 21 | 12 | −4.19005 | 0.423126 | |
| Zero solution | −1.91383 | 21 | 11 | −4.19005 | 0.423126 | |
| Zero solution | −1.96576 | 21 | 10 | −4.19005 | 0.423126 | |
| Plus solution | −1.69005 | 21 | 15 | −4.19005 | 0.423126 | |
| Plus solution | 0.126251 | 21 | 15 | −2.37375 | 2.35457 | |
| Minus solution | −0.232544 | 21 | 16 | −2.54272 | 2.26746 | |
| Minus solution | −2.07687 | 21 | 9 | −4.19005 | 0.423126 | |
| Zero solution | −0.77298 | 20 | 17 | −3.2204 | 0.423126 | |
| Zero solution | −1.52602 | 20 | 16 | −3.2204 | 0.423126 | |
| Zero solution | −1.56644 | 20 | 15 | −3.2204 | 0.423126 | |
| Zero solution | −2.13205 | 20 | 9 | −4.19005 | −0.155106 | |
| Zero solution | −2.13701 | 20 | 8 | −4.19005 | −0.155106 | |
| Zero solution | −2.25719 | 20 | 7 | −4.19005 | −0.155106 | |
| Zero solution | −2.37375 | 20 | 6 | −4.19005 | −0.155106 | |
| Zero solution | −2.48825 | 20 | 5 | −4.19005 | −0.155106 | |
| Zero solution | −2.54272 | 20 | 4 | −4.19005 | −0.155106 | |
| Plus solution | −0.444351 | 20 | 17 | −2.94435 | 1.8943 | |
| Plus solution | −0.720398 | 20 | 17 | −3.2204 | 0.423126 | |

TABLE 10-continued

| Solution type | Kerning value | count | left count | left value | right value |
| --- | --- | --- | --- | --- | --- |
| Plus solution | 0.242813 | 20 | 14 | −2.25719 | 2.35457 |
| Minus solution | −0.605698 | 20 | 17 | −2.94435 | 1.8943 |
| Minus solution | −0.433609 | 20 | 16 | −2.54272 | 2.06639 |
| Minus solution | −2.65511 | 20 | 3 | −4.19005 | −0.155106 |
| Zero solution | −0.656662 | 19 | 17 | −2.94435 | 0.423126 |
| Zero solution | −2.94435 | 19 | 3 | −4.19005 | −0.656662 |
| Plus solution | 0.362991 | 19 | 13 | −2.13701 | 2.35457 |
| Minus solution | −3.15666 | 19 | 2 | −4.19005 | −0.656662 |
| Zero solution | −3.2204 | 18 | 2 | −4.19005 | −0.77298 |
| Plus solution | 0.36795 | 18 | 12 | −2.13205 | 2.35457 |
| Minus solution | −3.27298 | 18 | 1 | −4.19005 | −0.77298 |
| Zero solution | 0.423126 | 17 | 12 | −1.96576 | 2.35457 |
| Plus solution | 0.534241 | 17 | 12 | −1.96576 | 2.35457 |
| Minus solution | −4.02602 | 17 | 1 | −4.19005 | −1.52602 |
| Plus solution | 0.586166 | 16 | 11 | −1.91383 | 2.35457 |
| minus solution | 4.06644 | 16 | 1 | −4.19005 | −1.56644 |
| Zero solution | −4.19005 | 15 | 1 | −4.19005 | −1.74623 |
| Plus solution | 0.610443 | 15 | 10 | −1.88956 | 2.35457 |
| Minus solution | −4.24623 | 15 | 0 | −4.19005 | −1.74623 |
| Plus solution | 0.611755 | 14 | 9 | −1.88824 | 2.35457 |
| Minus solution | −4.31242 | 14 | 0 | −4.19005 | −1.81242 |
| Plus solution | 0.687576 | 13 | 8 | −1.81242 | 2.35457 |
| Minus solution | −4.38824 | 13 | 0 | −4.19005 | −1.88824 |
| Plus solution | 0.753769 | 12 | 7 | −1.74623 | 2.35457 |
| minus solution | −4.38956 | 12 | 0 | −4.19005 | −1.88956 |
| Plus solution | 0.933563 | 11 | 6 | −1.56644 | 2.35457 |
| Minus solution | −4.41383 | 11 | 0 | −4.19005 | −1.91383 |
| Plus solution | 0.973984 | 10 | 5 | −1.52602 | 2.35457 |
| Minus solution | −4.46576 | 10 | 0 | −4.19005 | −1.96576 |
| Plus solution | 1.72702 | 9 | 4 | −0.77298 | 2.35457 |
| Minus solution | −4.63205 | 9 | 0 | −4.19005 | −2.13205 |
| Plus solution | 1.84334 | 8 | 3 | −0.656662 | 2.35457 |
| Minus solution | −4.63701 | 8 | 0 | −4.19005 | −2.13701 |
| Zero solution | 2.30391 | 7 | 6 | −0.155166 | 2.35457 |
| Zero solution | 2.26746 | 7 | 5 | −0.155106 | 2.35457 |
| Zero solution | 2.06639 | 7 | 4 | −0.155106 | 2.35457 |
| Zero solution | 1.8943 | 7 | 3 | −0.155106 | 2.35457 |
| Plus solution | 2.34489 | 7 | 6 | −0.155106 | 2.35457 |
| Minus solution | −4.75719 | 7 | 0 | −4.19005 | −2.25719 |
| Zero solution | 2.35457 | 6 | 6 | 0.423126 | 2.35457 |
| Plus solution | 2.92313 | 6 | 6 | 0.423126 | 2.35457 |
| Minus solution | −4.87375 | 6 | 0 | −4.19005 | −2.37375 |
| Plus solution | 4.3943 | 5 | 5 | 1.8943 | 2.35457 |
| Minus solution | −4.98825 | 5 | 0 | −4.19005 | −2.48825 |
| Plus solution | 4.56639 | 4 | 4 | 2.06639 | 2.35457 |
| Minus solution | −5.04272 | 4 | 0 | −4.19005 | −2.54272 |
| Plus solution | 4.76746 | 3 | 3 | 2.26746 | 2.35457 |
| Minus solution | −5.44435 | 3 | 0 | −4.19005 | −2.94435 |
| Plus solution | 4.80391 | 2 | 2 | 2.30391 | 2.35457 |
| Minus solution | −5.7204 | 2 | 0 | −4.19005 | −3.2204 |
| Plus solution | 4.85457 | 1 | 1 | 2.35457 | 2.35457 |
| Minus solution | −6.69005 | 1 | 0 | −4.19005 | −4.19005 |

Figure 10:
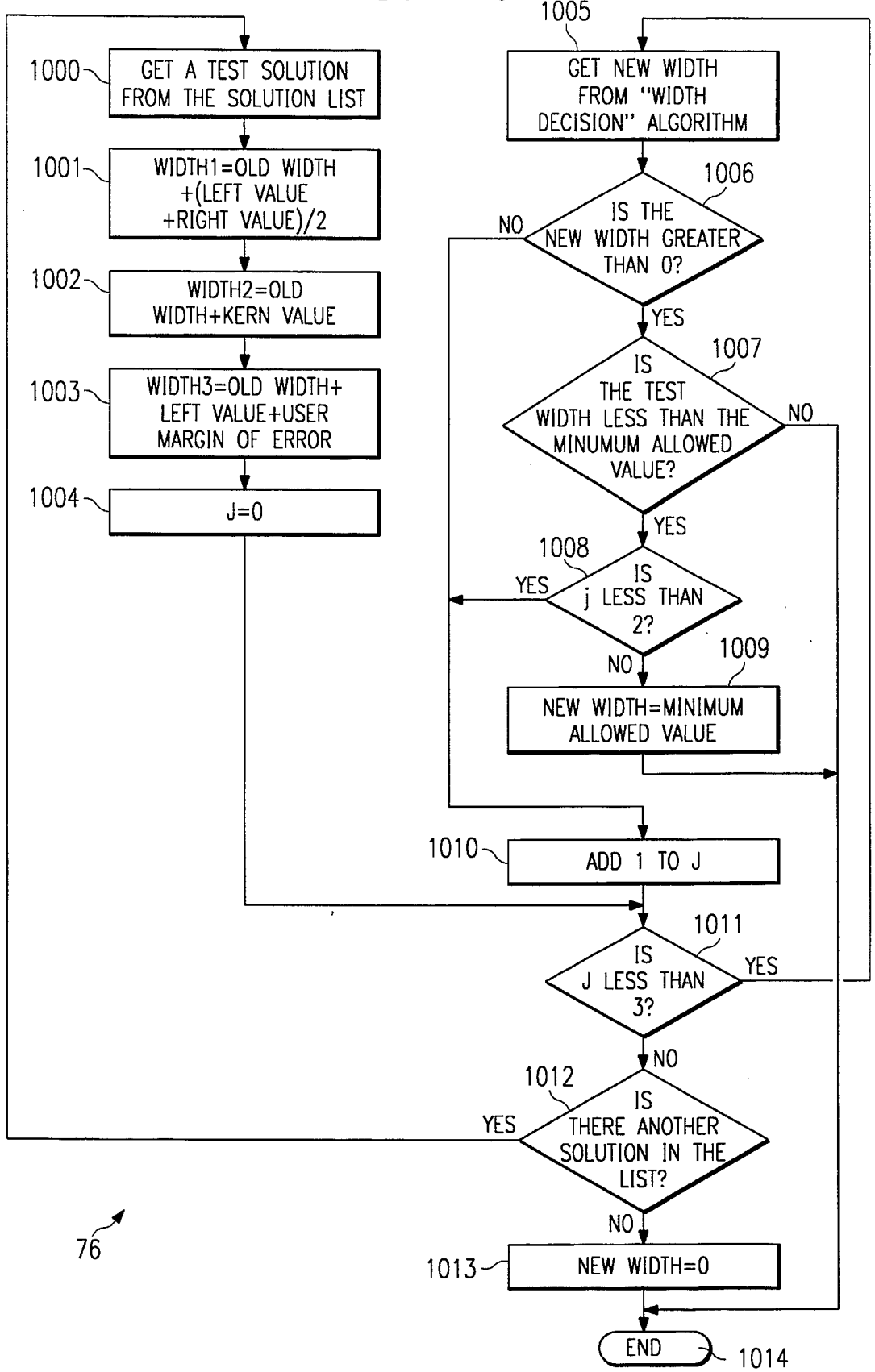
FIG. 10 illustrates a flow diagram wherein the new widths for each character are produced.

Thereafter, in FIG. 7, step 76 executes a subprocess for obtaining the new width for each of characters "A" and "B". This subprocess is illustrated in FIG. 10. In step 1000, a test solution is retrieved from the solution list for each of characters "A" and "B". In this case, from Table 9, the test solution designated as the "zero" solution with a kerning value of 7.19453 is retrieved. Note that this test solution has one of the three highest count values (15), and one of the two highest left count values (6). As noted within the aforementioned sorting subprocess illustrated in FIG. 9, the "zero" solution was sorted before the second item in Table 9, i.e., the "plus" solution because of step 91 in FIG. 9, which sorted the two test solutions by solution type.

Referring again to FIG. 10, in step 1001, the value labeled as width1 is computed as the old width for character "A" plus the average of the left and right values associated with the test solution.

As noted within Table 2, the old width for character "A" is equal, in this example, to 81.375 units. This is added to the average of the left value of 4.90298 plus the right value of 9.21584, this average equating to 7.05941 units. 7.05941 is added to 81.375 to arrive at 88.43441 units for width1.

Thereafter, in step 1002, a value labeled as width2 is computed as the old width for character "A" (81.375) plus the kerning value for the test solution (7.19453) which equals to 88.56953 units.

Next, in step 1003, a third value labeled as width3 is computed as the old width for character "A" plus the left value plus the aforementioned margin of error (2.5). This width3 value, in this example pertaining to the first test solution within Table 9, equates to 88.8048.

Thereafter, in step 1004, a parameter labeled as "j" is set equal to 0. Next, in step 1011, a determination is made whether or not this parameter "j" is less than 3. If it is not less than 3, the subprocess proceeds to step 1012; however, since in this instance, "j" is less than 3, the subprocess proceeds to step 1005 to determine the new width for character "A" by utilization of a "width decision" subprocess, which is illustrated in FIG. 11.

Figure 11:
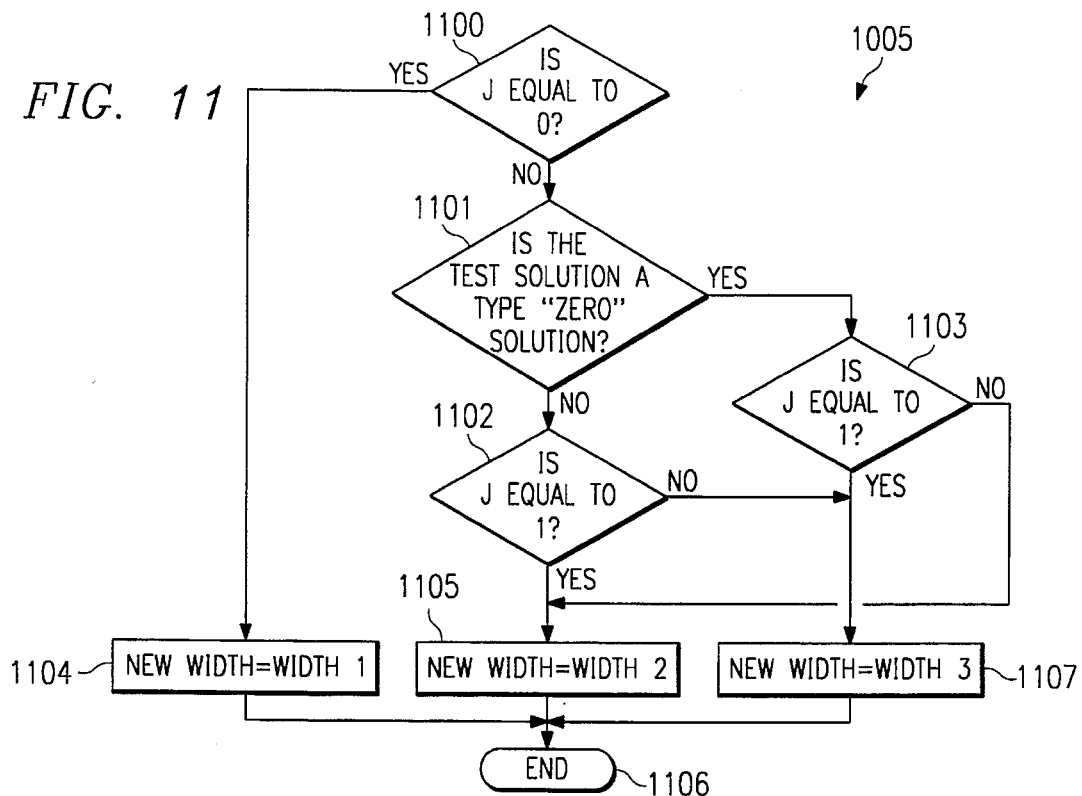
FIG. 11 illustrates a width decision subprocess.

Referring next to FIG. 11, this subprocess begins with step 1100, wherein it is determined whether or not the parameter "j" is equal to 0. Since in this case it is, the subprocess proceeds to step 1104 wherein the new width for character "A" is designated to be equal to the value associated with width1 calculated above to be equal to the old width plus an average of the left and right values associated with the test solution. The subprocess in FIG. 11 then ends at step 1106.

Figure 12:
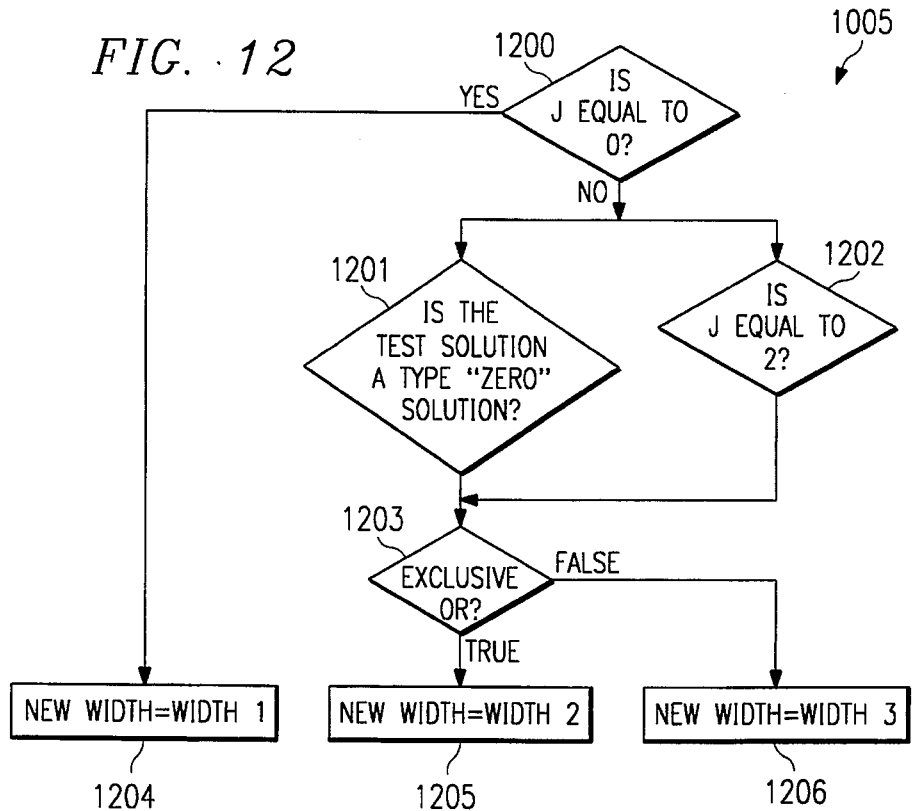
FIG. 12 illustrates an alternative flow diagram for width decision subprocess.

Note that FIG. 12 illustrates an alternative subprocess for determining the new width for character "A". In this subprocess, the new width is also determined, in this example, to be equal to width1 (step 1204).

FIG. 12 uses a standard computer concept of the "exclusive or" decision process. FIG. 12 illustrates how to use the "exclusive or" operator to implement the determination of the new width. FIG. 11 expands out the "exclusive or" implementation into standard conditional statements. The process within FIG. 11 nay be used if the process within FIG. 12 is unavailable.

Note that the various choices available for the new width, i.e., width1, width2 and width3, are provided since it is possible that a calculated new width will have a value less than the specified minimum value for the width (see Table 2). Three choices are given on the presumption that one of the choices (width1, width2, width3) will be greater than the minimum value.

Generally, width1 is preferred. Width1 is the middle or median value among the kerning pairs being tested, thus, minimizing the distance between the chosen width and the eliminated kerning pair that is farthest from the chosen width.

A weighted average may not be used because the width chosen might leave some of the kerning pairs that were previously determined to be eliminatable (in the "get frequency" process) outside the predefined margin of error.

If the solution is a "zero solution," then width2 is preferred over width3. In the case of a "zero solution," then width2 will be the exact solution needed to eliminate one kerning pair. Width3 is the right-most possible solution that still eliminates all the kerning pairs specified by the "count" value. Width3 will have the best chance of being greater than the minimum value since it will always be the largest value.

If the chosen solution is not a "zero solution," then it will not exactly eliminate any solutions. Therefore, width3 is preferred over width2 in this case.

Note that in the example illustrated herein, the subprocess within FIG. 10 and the subprocesses within FIGS. 11 and 12 will arrive at the new width for character "A" to be based on the first test solution within Table 9 and to be equal to the old width plus the average of the left and right computed values.

Likewise, with respect to character "B" and the associated test solutions within Table 10, the first test solution within Table 10 is also utilized to arrive at the new width for the character "B" equal to the old width of 68.75 plus an average of the left and right values of the first test solution ((−2.54272+2.35457)/2=−0.094075), which equates to a new width value of 68.655925 (step 77).

After all of the widths for all the characters within the character set have been designated, the subprocess in FIG. 7 ends in step 78.

Returning again to FIG. 6, after all kerning pair groups have been processed (step 63), the process in FIG. 6 will proceed to step 64 to allow the user to specify whether or not numeric characters are to be monospaced. If not, the process will proceed to step 66 to determine spacing for empty characters. However, if the user does wish to monospace numeric characters, the process will proceed to step 65 to do so.

Figure 13:
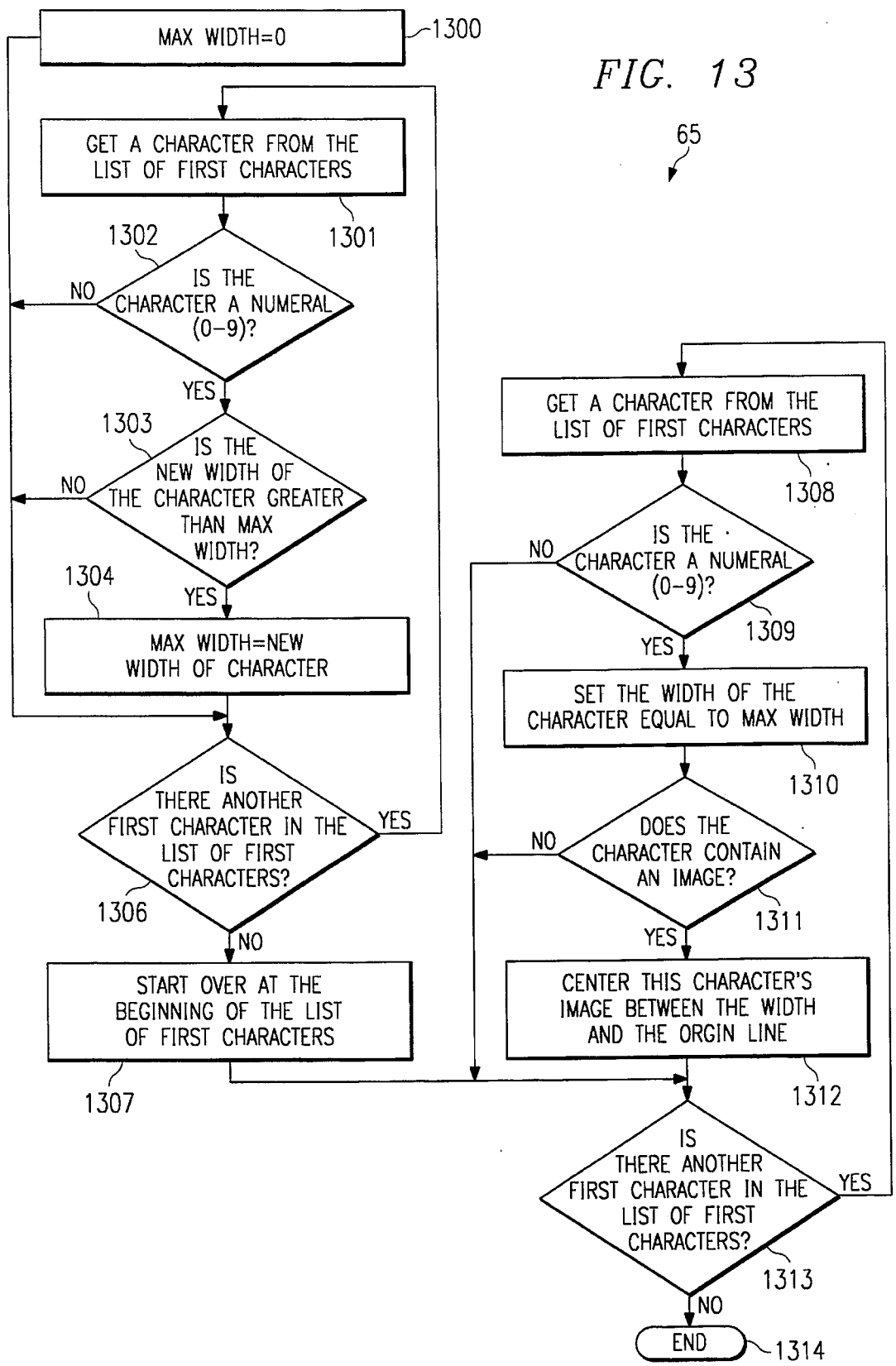
FIG. 13 illustrates a flow diagram for providing for monospacing of numeric characters.

Referring next to FIG. 13, there is shown a flow diagram for monospacing numeric characters in accordance with step 65. This subprocess begins in step 1300 where the maximum width is initialized to a value of zero. Thereafter, in step 1306, a determination is made whether them is another first character in the list of first characters. If not, the subprocess proceeds to step 1307; however, since there is another first character in the list, the subprocess proceeds to step 1301 to retrieve a character from the list.

Thereafter, in step 1302, the subprocess determines whether or not the retrieved character is a numeric character. If not, the subprocess returns to 1306; however, if the retrieved character is a numeric character, the subprocess proceeds to step 1303 to determine whether the new width computed above (see FIGS. 10–12) for this numeric character is greater than the initialized maximum width (step 1300). Since it is, the subprocess proceeds to step 1304 to set the maximum width equal to this new width. Thereafter, the subprocess proceeds through the remainder of the list of first characters as described above. Essentially, the subprocess will continue until all numeric characters have been processed, and the maximum width will be designated to be equal to the largest new width of any of the numeric characters.

Once all numeric characters within the list of characters have been processed, the subprocess will proceed from step 1306 to step 1307 to begin again with the list of first characters. Next, in step 1313, the subprocess determines whether or not there is another first character in the list of first characters. Since there is, the subprocess will proceed to step 1308 to get a character from the list of first characters. Thereafter, in step 1309, the subprocess determines whether or not this retrieved character is a numeric character, and if it is, the subprocess proceeds to step 1310 to set the width of this character equal to the maximum width. Thereafter, in step 1311, the subprocess decides whether or not the character contains an image. If not, the subprocess proceeds to step 1313; however, if there is an image, the subprocess proceeds to step 1312 to center this character's image between the width and the origin line. These subprocesses between steps 1308 and 1313 will continue until all numeric characters have been centered between the width and the origin line with respect to this new maximum width. The subprocess then ends at step 1314. Note that in step 1312, in order to center the image of a character, the left sidebearing value (the horizontal value of the left-most point of the image) must be computed as follows:

new left side bearing value=(width−current right sidebearing value+current left side bearing value)/2.

After step 1314, control is returned to the spacing process in FIG. 6 which proceeds to step 66. The details of step 66 are illustrated in FIG. 14, which is a subprocess for calculating spacing for empty characters, beginning with step 1401. Thereafter, at step 1402, the subprocess determines whether or not the width of the 'n' character is available. (Note: widths of characters other than 'n' and 'i' may be used.) If not, the subprocess proceeds to step 1403 to determine whether or not the width of the 'i' character is available. However, if the width of the 'n' character is available, the subprocess proceeds to step 1406 to initialize the empty width to be equal to the width of the 'n' character divided in half. Thereafter, the subprocess proceeds to step 1410 to determine whether there is another character to process.

Note that in step 1403, if the width of the 'i' character is available, but the width of the 'n' character is not available, the subprocess will then end up proceeding to step 1405 to designate the empty width to be equal to the width of the 'i' character. However, if neither the width of the 'n' character or 'i' character are available, the subprocess will proceed to step 1404 to designate the empty width to be equal to "em square" divided by 3.

Thereafter, as each first character is processed and retrieved, it is determined whether or not it is an empty character in step 1408. If it is, then the width of this empty character is then set to the width designated above (step 1409). After all characters have been processed, and all empty characters have been designated with the empty width, the subprocess ends at step 1411 and returns control to step 66 in FIG. 6, which then concludes with step 67.

Note that in step 1408, the bounding box information shown in Table 1 is utilized to determine whether or not a character is an empty character. Note that within the bounding box information, if the right value is less than or equal to the left value and the top value is less than or equal to the bottom value, then the character is an empty character. The bounding box information for empty characters is usually specified as 0 for all the values.

Note that all of the above processes and subprocesses may be operated within CPU 1501. Thereafter, the characters and their associated new widths may then be stored either within main memory 1502 or mass storage 1506, and also available for output through I/O 1511 for output to output devices 1512 and 1513, or to output through CRT 1510.

Although the present invention and its advantages have been described in detail, it should be understood that various changes, substitutions and alterations can be made herein without departing from the spirit and scope of the invention as defined by the appended claims.

What is claimed is:

1. A method for spacing characters displayed by an output device, said method comprising the steps of:

identifying character pairs;

receiving input comprising relative spacing information between characters of each identified character pair;

computing a width for each of said characters as a function of said relative spacing information; and outputting to said output device selected ones of said characters including said selected ones of said characters' widths.

2. The method as recited in claim 1 wherein said relative spacing information is comprised of kerning values.

3. The method as recited in claim 2 wherein said computing step further comprises the step of:

determining a range of kerning values for each unique character which would bound a maximum number of said kerning values of said character pairs having as their first character said unique character, said determining step incorporating a predetermined margin of error, wherein each of said widths is derived from each of said determined ranges of kerning values.

4. The method as recited in claim 3 wherein each of said widths is equal to an average of the minimum and the maximum kerning values within each of said ranges.

5. The method as recited in claim 1 wherein said characters are comprised of a font of alphanumeric characters.

6. The method as recited in claim 1 further comprising the step of:

receiving input data pertaining to a desired margin of error when computing said widths.

7. The method as recited in claim 1 wherein said computing step further comprises the steps of:

incorporating a range value with said relative spacing information; and for each of said characters, determining which pair of characters has a relative spacing that encompasses a highest frequency of said pairs.

8. The method as recited in claim 1 wherein said width for each of said characters is determined so that a maximum number of said pairs have a desired amount of space therebetween within a predefined margin of error.

9. A method for determining a distance between a first character and any second character within a set of characters when said characters are displayed on a medium, said method comprising the steps of:

identifying a set of character pairs, each character pair of said set comprising said first character and a second character, said second character of any particular character pair being different than said second character of any other character pair of said set;

receiving relative distance values of each of said character pairs;

computing said distance as a function of said received relative distance values, said distance computed to result in a desirable amount of space between a maximum number of said characters when displayed; and outputting data pertaining to a particular font of said first character and said computed distance, said data configurable for use by a display device to display said first character.

10. The method as recited in claim 9 wherein said relative distance values are kerning values, and said character pairs are kerning pairs.

11. The method as recited in claim 10 wherein said computing step further comprises the step of:

minimizing a retention of said received kerning pairs required to achieve a desired spacing between said first character and said any second character.

12. The method as recited in claim 9 wherein said computing step further comprises the step of:

determining a range of said received relative distance values for each of said character pairs, said range determining step incorporating a predefined margin of error.

13. The method as recited in claim 12 wherein said computing step further comprises the step of:

for each of said ranges, counting a number of said character pairs having relative distance values bounded by said ranges; and averaging said range associated with the largest number counted, wherein said distance is dependent upon said averaged range.

14. A system for automatically providing a desired amount of space between a first character and any second character within a set of characters, said system comprising:

means adapted for receiving input comprising relative distance values of a set of character pairs wherein said first character is the initial character in each of said character pairs;

means for computing said amount of space as a function of said received relative distance values, said computed amount of space providing a desired amount of space between said first character and a plurality of said second characters; and means adapted for outputting data pertaining to a particular font of said first character and said any second character, said data including said computed amount of space, said data configurable for use by a display device to display said first character and said any second character with said computed amount of space between said first character and said any second character.

15. The system as recited in claim 14 wherein said relative distance values are kerning values and said character pairs are kerning pairs.

16. The system as recited in claim 15 wherein said computing means further comprises:

means for computing a range of values for each of said kerning values, wherein each of said range of values is based upon its corresponding kerning value and a predefined margin of error;

first means for determining which of said computed ranges encompasses a maximum number of said kerning values; and second means for determining said amount of space by utilizing said determined range.

17. The system as recited in claim 16 wherein said second determining means further comprises:

means for adding an average of said determined range to a former width value of said first character.

18. The system as recited in claim 16 wherein said first determining means further comprises:

means for counting the number of said kerning values that are encompassed within each of said computed ranges;

means for selecting said kerning value having the largest number of said kerning values that are encompassed within each of said computed ranges.

19. The system as recited in claim 18 wherein said second determining means further comprises:

means for adding said selected kerning value to a former width value of said first character.

20. The system as recited in claim 18 wherein said second determining means further comprises:

means for adding an average of the minimum and maximum kerning values included within said largest number of said kerning values to a former width value of said first character.

21. The system as recited in claim 14, further comprising:

means for receiving input comprising a predefined margin of error, wherein said computed amount of space is dependent upon said margin of error.

22. The system as recited in claim 14 wherein said computing means further comprises:

means for determining, within a predefined margin of error, which of said relative distance values is consistent with a maximum number of said relative distance values.

23. A data processing system for providing a desired amount of space between characters to be displayed by an output device coupled to said system, said system comprising:

an input means for receiving input comprising relative spacing information between characters of pre-identified pairs of said characters, each one of said pre-identified pairs of characters having a first character and a second character;

a memory device, coupled to said input means, for storing said received input;

a microprocessor, coupled to said input means and said memory device, capable of computing a width for each of said characters as a function of said relative spacing information associated with pairs having said character for which width is being computed as said first character; and an output means, coupled to said input means, said memory device and said microprocessor, for outputting to said output device selected ones of said characters including said selected ones of said characters' widths.

24. The system as recited in claim 23 wherein said relative spacing information is comprised of kerning values for kerning pairs of said characters.

25. The system as recited in claim 24 wherein said microprocessor is capable of determining a range of kerning values for each unique character which would bound a maximum number of said kerning values of said character pairs having as their first character said unique character, said determining step incorporating a predetermined margin of error, wherein each of said widths is derived from each of said determined ranges of kerning values.

26. The system as recited in claim 23, further comprising:

means, coupled to said microprocessor, for generating said relative spacing information.

27. The system as recited in claim 23 wherein said microprocessor is capable of generating said relative spacing information.

28. The system as recited in claim 23 wherein said relative spacing information is user defined.

29. The system as recited in claim 23 wherein said output device is a display monitor.

30. The system as recited in claim 23 wherein said output device is a printer.

31. The system as recited in claim 23 wherein said output device is a printing press.

32. The system as recited in claim 23 wherein said output device is an electromechanical device.

33. A system for automatically spacing characters to be displayed on a medium by a display device coupled to said system, said system comprising:

means for inputting a list of kerning pair groups, wherein each kerning pair within each one of said groups includes a particular first character spaced a defined distance from each one of said characters;

means for inputting a width for each of said first characters;

means for computing a distance value as a function of said defined distances for each of said groups, said computed distance value being a desirable amount of space between said particular first character and more than one character of said characters;

means for adding each of said computed distance values to each corresponding width; and means for selectively outputting said characters to said display device, said outputted characters including said computed distance values.

34. The system as recited in claim 33, further comprising:

means for monospacing numeric characters.

35. The system as recited in claim 34, further comprising:

means for computing spacing values for empty characters; and means for outputting said spacing values to said display device when said empty characters are outputted by said system.

36. The system as recited in claim 33, further comprising:

means for selectively disallowing certain computed distance values.

37. The system as recited in claim 33 wherein said list of kerning pair groups is generated by a kerning process operating within said system.

38. The system as recited in claim 33 wherein said computing means further comprises:

means for computing a plurality of possible solutions by adding and subtracting a predefined margin of error value to each of said kerning values within each group.

39. The system as recited in claim 38 wherein said computing means further comprises:

means for sorting said possible solutions by kerning values.

40. The system as recited in claim 33 wherein said computing means further comprises:

means for computing a left range value for each of said kerning pairs within each of said groups by subtracting a predefined margin of error from each kerning value associated with each of said kerning pairs; and means for computing a right range value for each of said kerning pairs within each of said groups by adding a predefined margin of error to said each kerning value, wherein, for each of said kerning pairs, said left and right range values encompass a test range.

41. The system as recited in claim 40 wherein said computing means further comprises:

means for counting said kerning pairs within each of said test ranges.

42. The system as recited in claim 41 wherein said computing means further comprises:

means for sorting said counted kerning pairs for each of said groups.

43. The system as recited in claim 41 wherein said computing means further comprises:

means for selecting said kerning value within each of said groups having the most of said kerning pairs within its said test range, wherein said selected kerning values are said computed distance values.

44. The system as recited in claim 41 wherein said computing means further comprises:

means for averaging said left and right range values associated with said kerning values within each of said groups having the most of said kerning pairs within each of said test ranges, wherein said averaged left and right range values are said computed distance values.

45. A computer program stored on a machine-readable medium in a format directly executable by a hardware processor, said computer program operable for determining a distance between a first character and any second character within a set of characters when said characters are displayed on a medium, said program comprising:

a first instruction set for receiving relative distance values of character pairs wherein said first character is the initial character in each of said character pairs;

a second instruction set for computing said distance as a function of said received relative distance values, said computed distance being a desirable distance between said first character and more than one said second character; and a third instruction set for outputting data pertaining to a particular font of said first character and said computed distance, said data configurable for use by a display device to display said first character.

46. The computer program as recited in claim 45 wherein said relative distance values are kerning values, and said character pairs are kerning pairs.

47. The computer program as recited in claim 46 wherein said computing step further comprises the step of:

minimizing a retention of said received kerning pairs required to achieve a desired spacing between said first character and said any second character.

48. The computer program as recited in claim 45 wherein said second instruction set further comprises:

a fourth instruction set for determining a range of said received relative distance values for each of said character pairs, said fourth instruction set incorporating a predefined margin of error.

49. The computer program as recited in claim 48 wherein said second instruction set further comprises:

for each of said ranges, a fifth instruction set for counting a number of said character pairs having relative distance values bounded by said ranges; and a sixth instruction set for averaging said range associated with the largest number counted, wherein said distance is dependent upon said averaged range.

50. The computer program as recited in claim 45 wherein said machine-readable medium is a magnetic storage medium.

51. The computer program as recited in claim 45 wherein said machine-readable medium is an optical storage medium.

52. A method implemented within a data processing system for spacing characters, said method comprising the steps of:

receiving input comprising relative spacing information between pairs of said characters, said pairs of characters including at least a first character and a second character; and computing a width for each of said characters as a function of said relative spacing information having said character for which width is computed as one of said first or second characters.

53. The method as recited in claim 52, further comprising the step of:

outputting to an output device selected ones of said characters including said selected ones of said characters' widths.

54. The method as recited in claim 53 wherein said computing step further comprises the step of:

determining a range of kerning values for each unique character which would bound a maximum number of said kerning values of said character pairs having as their first character said unique character, said determining step incorporating a predetermined margin of error, wherein each of said widths is derived from each of said determined ranges of kerning values.

55. The method as recited in claim 54 wherein each of said widths is equal to an average of the minimum and the maximum kerning values within each of said ranges.

56. The method as recited in claim 52 wherein said relative spacing information is comprised of kerning values.

57. The method as recited in claim 52 wherein said characters are comprised of a font of alphanumeric characters.

58. The method as recited in claim 52 further comprising the step of:

receiving input data pertaining to a desired margin of error when computing said widths.

59. The method as recited in claim 52 wherein said computing step further comprises the steps of:

incorporating a range value with said relative spacing information; and for each of said characters, determining which pair of characters has a relative spacing that encompasses a highest frequency of said pairs.

60. The method as recited in claim 52 wherein said width for each of said characters is determined so that a maximum number of said pairs have a desired amount of space therebetween within a predefined margin of error.

61. A method for spacing characters displayed by an output device, said method comprising the steps of:

identifying kerning pairs of said characters, said kerning pairs each comprising a first one of said characters and a second one of said characters;

for each said kerning pair, identifying a relative spacing between said first character and said second character;

identifying sets of said kerning pairs, said sets comprising kerning pairs having a same said first character;

receiving input including said relative spacing for each said kerning pair of said set;

computing a width for said characters, said width for any particular one of said characters being a function of said relative spacing information associated with said set of kerning pairs having said particular character as said first character, said width computed to result in a desirable amount of space between said particular character and a plurality of said characters when said characters are displayed by said output device.

* * * * *